(12) United States Patent
Mizukoshi

(10) Patent No.: US 8,630,254 B2
(45) Date of Patent: Jan. 14, 2014

(54) TELEPHONE LINE SWITCHING APPARATUS, TELEPHONE LINE SWITCHING SYSTEM, TELEPHONE RELAY SYSTEM, TELEPHONE RELAY METHOD, TELEPHONE RELAY PROGRAM

(75) Inventor: Yasuhiro Mizukoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 1536 days.

(21) Appl. No.: 11/555,089

(22) Filed: Oct. 31, 2006

(65) Prior Publication Data

US 2007/0121605 A1   May 31, 2007

(30) Foreign Application Priority Data

Oct. 31, 2005  (JP) ................................. 2005-316636
Sep. 7, 2006   (JP) ................................. 2006-243375

(51) Int. Cl.
*H04W 4/00*     (2009.01)
*H04L 12/28*    (2006.01)
*H04L 12/56*    (2011.01)
*H04J 3/24*     (2006.01)
*H04W 36/00*    (2009.01)

(52) U.S. Cl.
USPC ..... 370/331; 370/389; 370/395.2; 370/395.5; 370/475; 455/436

(58) Field of Classification Search
None
See application file for complete search history.

(56) References Cited

U.S. PATENT DOCUMENTS

| | | | |
|---|---|---|---|
| 6,847,821 B1 * | 1/2005 | Lewis et al. ................. | 455/452.2 |
| 7,184,418 B1 * | 2/2007 | Baba et al. .................... | 370/331 |
| 7,558,239 B1 * | 7/2009 | Rasanen ........................ | 370/338 |
| 7,724,699 B2 * | 5/2010 | Baey et al. .................... | 370/328 |
| 7,729,700 B2 * | 6/2010 | Alemany et al. .............. | 455/436 |
| 2003/0220835 A1 * | 11/2003 | Barnes, Jr. ...................... | 705/14 |
| 2004/0240399 A1 * | 12/2004 | Corrao et al. ................. | 370/260 |
| 2006/0052113 A1 * | 3/2006 | Ophir et al. ................. | 455/456.1 |
| 2006/0072542 A1 * | 4/2006 | Sinnreich et al. ............. | 370/351 |
| 2006/0140200 A1 * | 6/2006 | Black et al. .................... | 370/401 |
| 2006/0218283 A1 * | 9/2006 | Jones et al. .................... | 709/227 |
| 2006/0229098 A1 * | 10/2006 | LaBauve et al. ........... | 455/552.1 |

FOREIGN PATENT DOCUMENTS

| | | |
|---|---|---|
| JP | 2001-024743 | 1/2001 |
| JP | 2003-258998 | 9/2003 |
| JP | 2004-512750 | 4/2004 |
| JP | 2005-094646 | 4/2005 |
| WO | WO/02/33984 A1 | 4/2002 |

OTHER PUBLICATIONS

Japanese Office Action of Jun. 14, 2011.

* cited by examiner

*Primary Examiner* — Faruk Hamza
*Assistant Examiner* — Cassandra Decker
(74) *Attorney, Agent, or Firm* — Dickstein Shapiro LLP

(57) ABSTRACT

A telephone relay system enabling a terminal having multiple telephone numbers to originate and receive calls same as a terminal having only one telephone number is provided. When a connection management unit of an agent device receives a call request from a terminal device, it activates a terminal calling unit while designating a current telephone number and also activates a counterpart calling unit to establish a terminal-side connection between the current telephone number of the terminal device and the agent device and a counterpart-side connection between the agent device and the counterpart terminal. When an incoming call from the counterpart terminal arrives, the connection management unit establishes a counterpart-side connection corresponding to the incoming call, and activates the terminal calling unit while designating the current telephone number to establish a terminal-side connection. A communication relay unit relays the call by using the two connections established by the connection management unit.

13 Claims, 30 Drawing Sheets

FIG. 4

72 TEL.NO. DB

| COMMON NO. | CURRENT NO. |
|---|---|
| N1 | C1 |
| N2 | C2 |
| N3 | W3 |
| ⋮ | ⋮ |

TELEPHONE LINE SWITCHING APPARATUS, TELEPHONE LINE SWITCHING SYSTEM, TELEPHONE RELAY SYSTEM, TELEPHONE RELAY METHOD, TELEPHONE RELAY PROGRAM

BACKGROUND OF THE INVENTION

1. Field of the Invention

The present invention relates to a telephone relay technique, and in particular, to a technique to relay a call between a telephone set capable of connecting to a plurality of telephone networks and a counterpart device.

2. Description of Related Art

A telephone device capable of connecting to a plurality of telephone networks has been in practical use. Japanese Patent Laid-Open Publication No. 2005-94646 describes a VoIP (Voice over Internet Protocol) compatible router capable of connecting to an IP (Internet Protocol) network and a PSTN (Public Switched Telephone Network). The VoIP compatible router includes a telephone number memory which stores IP telephone numbers and PSTN telephone numbers by associating them and a telephone number conversion processor which converts a PSTN telephone number inputted by a user to an IP telephone number, and a dial origination block of the VoIP compatible router performs call origination processing with an IP telephone number.

FIG. 30 shows a communication network for a telephone device capable of connecting to a plurality of telephone networks. In FIG. 30, a telephone device 101 is capable of connecting to a third generation mobile telephone network (3GCS) 102 and a wireless LAN (WLAN) 106. To the telephone device 101, a telephone number C of the 3GCS is allocated for line connection over the mobile telephone network 102 and a telephone number W of WLAN is allocated for line connection over the wireless LAN 106.

The mobile telephone network 102 is connected to a SIP (Session Initiation Protocol) server 108 and to the Internet 109 respectively via a media gateway (MGW) 104. The wireless LAN 106 is connected to the SIP server 108 and to the Internet 109 respectively via a router 107.

When the telephone device 101 makes a call using the mobile telephone network 102, the telephone number C for 3GCS is used, and a call is made via the mobile telephone network 102, the media gateway 104 and the Internet 109. When the telephone device 101 makes a call using the wireless LAN 106, the telephone number W for the wireless LAN is used, and a call is made via the wireless LAN 106, the router 107 and the Internet 109. Connections between the telephone device 101 and the mobile telephone network 102 and the wireless LAN 106 are made by wireless communications of different types, respectively. Call connection control is performed by the SIP server 108.

However, the conventional art involves such a problem that a plurality of telephone numbers associated with the terminal (i.e., one for the mobile telephone network 102 and one for the LAN 106) cannot be associated on the communication network side, so the terminal cannot originate and receive calls with one telephone number.

SUMMARY OF THE INVENTION

It is an object of the present invention to provide a telephone relay system and the like enabling a primary terminal associated with a plurality of telephone numbers corresponding to different telephone networks to which the primary terminal can be connected to originate and receive calls in the same manner as a terminal having only a single telephone number.

The invention enables a call to be made to a counterpart (called) terminal as follows. A computer based agent device includes a telephone number obtainment unit which obtains the telephone number (the "current telephone number") associated with the telephone network which is presently being used by the primary terminal. A terminal calling unit calls the primary terminal using the current telephone number to establish a terminal-side connection between the agent device and the primary terminal. A call counterpart calling unit calls the counterpart terminal using the telephone number of the counterpart terminal as the call destination number and using a common telephone number associated with the primary terminal as the originator number.

A connection management unit activates the terminal calling unit designating the current telephone number and also activates the counterpart calling unit when receiving a call request from the primary terminal to establish a terminal-side connection between the primary terminal and the agent device and a counterpart connection between the agent device and the counterpart terminal, respectively. When an incoming call arrives from the counterpart terminal, the connection management unit establishes a counterpart-side connection by responding to the incoming call, and also establishes a terminal-side connection by activating the terminal calling unit designating the current telephone number as the number to be called.

A relay unit relays a call between the primary terminal and the counterpart terminal by transmitting data, received via one of the terminal-side connection and the counterpart-side connection, to the other connection.

Since the agent device has the relay unit, it is possible to mediate a call between the primary terminal and the counterpart terminal via the terminal-side connection and the counterpart-side connection.

The originator telephone number sent to the counterpart terminal is the common telephone number associated with the primary terminal, irrespective of the current telephone number. Further, when an incoming call arrives designating the common telephone number, a terminal-side connection using the current telephone number is established.

Therefore, the counterpart terminal called by the primary terminal (via the agent device) can always recognize that it is called by the primary terminal being identified by the common telephone number irrespective of which terminal telephone number is active (i.e., which telephone network the primary terminal is using). Further, when the counterpart terminal calls the primary terminal, it is only necessary to designate the common telephone number as the call destination without being aware of the current telephone number (i.e., which telephone network the primary telephone is using).

In other words, according to the agent device of the present invention, the primary terminal can be recognized as a telephone device having only a single telephone number by the counterpart terminal, so it is possible to conceal switching of the used telephone network (and corresponding telephone number) used by the primary terminal.

The agent device may include a line switching unit which operates when receiving a line switch request, from the primary terminal making a call with the counterpart terminal, to activate the terminal calling unit designating the switching telephone number and disconnect the connection using the telephone network corresponding to the current telephone number.

With this configuration, a telephone network used for the terminal-side connection can be switched without interrupting the call.

In the agent device, the current telephone number obtainment unit may obtain the current telephone number from a call arrival notification from the primary terminal received at the agent device.

With this configuration, the agent device can obtain the current telephone number over the network used for the terminal-side connection.

The agent device may further include a database access unit for accessing a telephone number database storing the common telephone number and the current telephone number while associating them with each other, and the telephone number obtainment unit may obtain the current telephone number associated with the common telephone number by searching the telephone number database using the common telephone number included in the connection request or the line switch request as a key.

With this configuration, the agent device does not need to be notified of the current telephone number from the primary terminal each time a connection request or a line switching request is given.

In the agent device, one telephone number may be selected from the terminal telephone numbers and used as a common telephone number.

With this configuration, there is no need to allocate a common telephone number to the primary terminal in addition to the terminal telephone numbers.

Further, in the case where the current telephone number is different from a terminal telephone number selected as the common telephone number, the terminal calling unit calls the current telephone number, so it is possible to realize a function of transferring an incoming call to the agent device to the common telephone number.

The agent device may be so configured that in the telephone number database, a transfer destination telephone number allocated to a telephone device other than the primary terminal is registered previously while being associated with the common telephone number, and if the current telephone number is different from the common telephone number, the terminal-side calling unit performs calling by setting the transfer destination telephone number as a call destination.

With this configuration, the terminal calling unit can obtain the transfer destination telephone number, so a transfer service to a device other than the primary terminal can be realized.

A telephone relay system according to the present invention comprises: a primary terminal; a counterpart terminal making a call with the primary terminal; and an agent device for mediating the call between the primary terminal and the counterpart terminal.

A plurality of terminal telephone numbers and a common telephone number are assigned to the primary terminal.

The telephone number obtainment unit of the agent device obtains the current telephone number, which is the telephone number currently used by the primary terminal, among the assigned terminal telephone numbers. A terminal calling unit calls the primary terminal with one of the terminal telephone numbers other than the current telephone number to establish a terminal-side connection between the agent device and the primary terminal, and a call counterpart calling unit calls the counterpart terminal using the telephone number of the counterpart terminal as the call destination and using a common telephone associated with the primary terminal as the originator number.

When a call origination request from the primary terminal is received, a call management unit activates the terminal calling unit designating the current telephone number and activates the call counterpart calling unit to establish a terminal-side connection between the primary terminal and the agent device and a counterpart-side connection between the agent device and the counterpart terminal, respectively. When an incoming call from the counterpart terminal arrives, the connection management unit establishes the counterpart-side connection responding to the incoming call and activates the terminal calling unit designating the current telephone number to establish the terminal-side connection.

A relay unit relays a call between the primary terminal and the counterpart terminal by transmitting data, received via one of the terminal-side connection and the counterpart-side connection, to the other connection.

Since the agent device has the relay unit, it is possible to mediate a call between the primary terminal and a counterpart terminal via the terminal-side connection and the counterpart-side connection.

The originator telephone number sent to the counterpart terminal, is the common telephone number associated with the primary terminal, irrespective of the current telephone number. Further, when an incoming call arrives designating the common telephone number, a terminal-side connection using the current telephone number is established.

Therefore, the counterpart terminal called by the primary terminal (via the agent device) can always recognize that it is called by the primary terminal being identified by the common telephone number irrespective of which telephone number is active. Further, when the counterpart terminal calls the primary terminal, it is only necessary to designate the common telephone number as the call destination without being aware of the current telephone number.

In other words, according to the telephone relay system of the present invention, the primary terminal can be recognized as a telephone device having only a single telephone number by the counterpart terminal, so it is possible to conceal switching of the network (and corresponding telephone number) used by the primary terminal.

In the telephone relay system, the agent device may include a line switching unit which operates when receiving a line switch request, from the primary terminal making a call with the counterpart terminal, to activate the terminal calling unit designating the switching (i.e, newly active) telephone number, and disconnect the connection using the network corresponding to the current telephone number.

With this configuration, a network used for the terminal-side connection can be switched without interrupting the call.

In the telephone relay system, the current telephone number obtainment unit may obtain the current telephone number from a call arrival notification from the primary terminal received by the agent device.

With this configuration, the primary terminal can notify the agent device of the current telephone number over the network used for the terminal-side connection.

In the telephone relay system, a line switching request transmission unit may transmit the current telephone number by a tone signal of a line switching network.

With this configuration, a line switch request can be transmitted even when the primary terminal cannot access a communication network other than the line switching network during a call simultaneously.

The telephone relay system may include a telephone number database storing the common telephone number and the current telephone number while associating them with each other, and the agent device may include a database access unit for accessing the telephone number database, whereby the telephone number obtainment unit obtains the current telephone number associated with the common telephone number by searching the telephone number database using the common telephone number included in the connection request or the line switch request as a key.

With this configuration, the agent device does not need to be notified of the current telephone number from the primary terminal each time a connection request or a line switch request is given.

In the telephone relay system, one telephone number may be selected from the terminal telephone numbers and used as a common telephone number.

With this configuration, there is no need to allocate a common telephone number to the primary terminal in addition to the terminal telephone numbers.

Further, in the case where the current telephone number is different from the terminal telephone number selected as the common telephone number, the terminal calling unit calls the current telephone number, so it is possible transfer an incoming call to the agent device to the common telephone number.

The telephone relay system may be configured so that, in the telephone number database, a transfer destination telephone number allocated to a telephone device other than the primary terminal is registered previously while being associated with the common telephone number, and if the current telephone number is different from the common telephone number, the terminal-side calling unit performs calling such that the transfer destination telephone number is a call destination number.

With this configuration, the terminal calling unit can obtain the transfer destination telephone number, so a transfer service to a device other than the primary terminal can be realized.

A telephone relay method according to the present invention includes: a telephone number obtaining step to obtain the telephone number associated with the telephone network which is presently being used, (the "current telephone number"); a calling step, wherein the agent device receives a connection request from the primary terminal to call the primary terminal with the current telephone number to establish a terminal-side connection between the agent device and the primary terminal, and a connection request to call the counterpart terminal using the counterpart telephone number to establish a counterpart-side connection between the agent device and the counterpart terminal; an incoming call handling step, triggered when an incoming call sent by the counterparty terminal arrives at the common telephone number to establish the counterpart-side connection, wherein the primary terminal is called with the current number to establish a terminal-side connection between the agent device and the primary terminal; and a relaying step in which the agent device relays a call between the primary terminal and the counterpart terminal by transmitting data, received via one of the terminal-side connection and the counterpart-side connection, via another connection.

The originator telephone number sent to the counterpart terminal is the common telephone number associated with the primary terminal, irrespective of the current telephone number. Further, when an incoming call arrives designating the common telephone number, a terminal-side connection using the current telephone number is established.

Therefore, the counterpart terminal called from the primary terminal (via the agent device) can always recognize that it is called by the primary terminal being identified by the common telephone number irrespective of which terminal telephone number is active. Further, when the counterpart terminal calls the primary terminal, it is only necessary to designate the common telephone number as the call destination without being aware of the current telephone number.

In other words, according to the telephone relay method of the present invention, the primary terminal can be recognized as a telephone device having only a single telephone number by the counterpart terminal, so it is possible to conceal switching of the network (and corresponding telephone number) used by the primary terminal.

The telephone relay method may further include a line switching step, operated when the agent device receives a request from the primary terminal to switch a network used for the call to a network corresponding to a switching telephone number which is one of the terminal telephone numbers other than the current telephone number after performing the step of relaying, to activate the terminal calling unit designating the switching telephone number, and disconnect the connection using the network corresponding to the current telephone number.

With this configuration, a network used for the terminal-side connection can be switched without interrupting the call.

A telephone relay program of the present invention causes a computer to execute: a telephone number obtaining function to obtain a current telephone number, wherein the agent device receives a connection request from the primary terminal to call the primary terminal using the current telephone number to establish a terminal-side connection between the agent device and the primary terminal, and a connection request to call the counterpart terminal using a counterpart telephone number to establish a counterpart-side connection between the agent device and the counterpart terminal; an incoming call handling function, triggered when an incoming call sent by the counterparty terminal arrives at the common telephone number to establish the counterpart-side connection, wherein the primary terminal is called with the current number to establish a terminal-side connection between the agent device and the primary terminal; and a relaying function in which the agent device relays a call between the primary terminal and the counterpart terminal by transmitting data, received via one of the terminal-side connection and the counterpart-side connection, via another connection.

According to the telephone relay program, the computer can be operated as an agent device having the respective functions.

Therefore, the counterpart terminal called by the primary terminal (via the agent device) can recognize that it is called by one telephone device associated with the common telephone number irrespective of which telephone number the primary terminal uses. Further, when the counterpart terminal calls the primary terminal, it is only necessary to designate the common telephone number as the call destination without being aware of the current telephone number.

In other words, according to the present invention, the primary terminal can be recognized as a telephone device having only a single telephone number by the counterpart terminal, so it is possible to conceal switching of the network (and corresponding telephone number) used by the primary terminal.

In the telephone relay program, the program may further cause the computer to execute a line switching function, operated when the agent device receives a request from the primary terminal to switch a network used for the call to a network corresponding to a switching telephone number which is one of the terminal telephone numbers other than the current telephone number after performing the step of relaying, to activate the terminal calling unit designating the switching telephone number, and disconnect the connection using the network corresponding to the current telephone number.

With this configuration, the computer executing the program can switch a network used for the terminal-side connection without interrupting the call.

EFFECT OF THE INVENTION

A telephone number of the primary terminal sent to the counterpart terminal is a common telephone number irrespective of the current telephone number. Further, when the counterpart terminal calls the common telephone number, the current telephone number is automatically used for the terminal-side connection.

Therefore, the counterpart terminal called by the primary terminal (via the agent device), recognizes only the common telephone number irrespective of which telephone number the primary terminal uses. Further, when the counterpart terminal calls the primary terminal, it is only necessary to designate the common telephone number as the call destination without being aware of the current telephone number.

In other words, according to the present invention, the primary terminal can be recognized as a telephone device having only a single telephone number by the counterpart terminal, so it is possible to conceal switching of the network (and corresponding telephone number) performed by the primary terminal.

BRIEF DESCRIPTION OF THE DRAWINGS

FIG. 4 is a table showing the data structure of a registration number database;

DESCRIPTION OF THE PREFERRED EMBODIMENTS

Hereinafter, embodiments of the present invention will be described based on the drawings.

Embodiment 1

Figure 1:
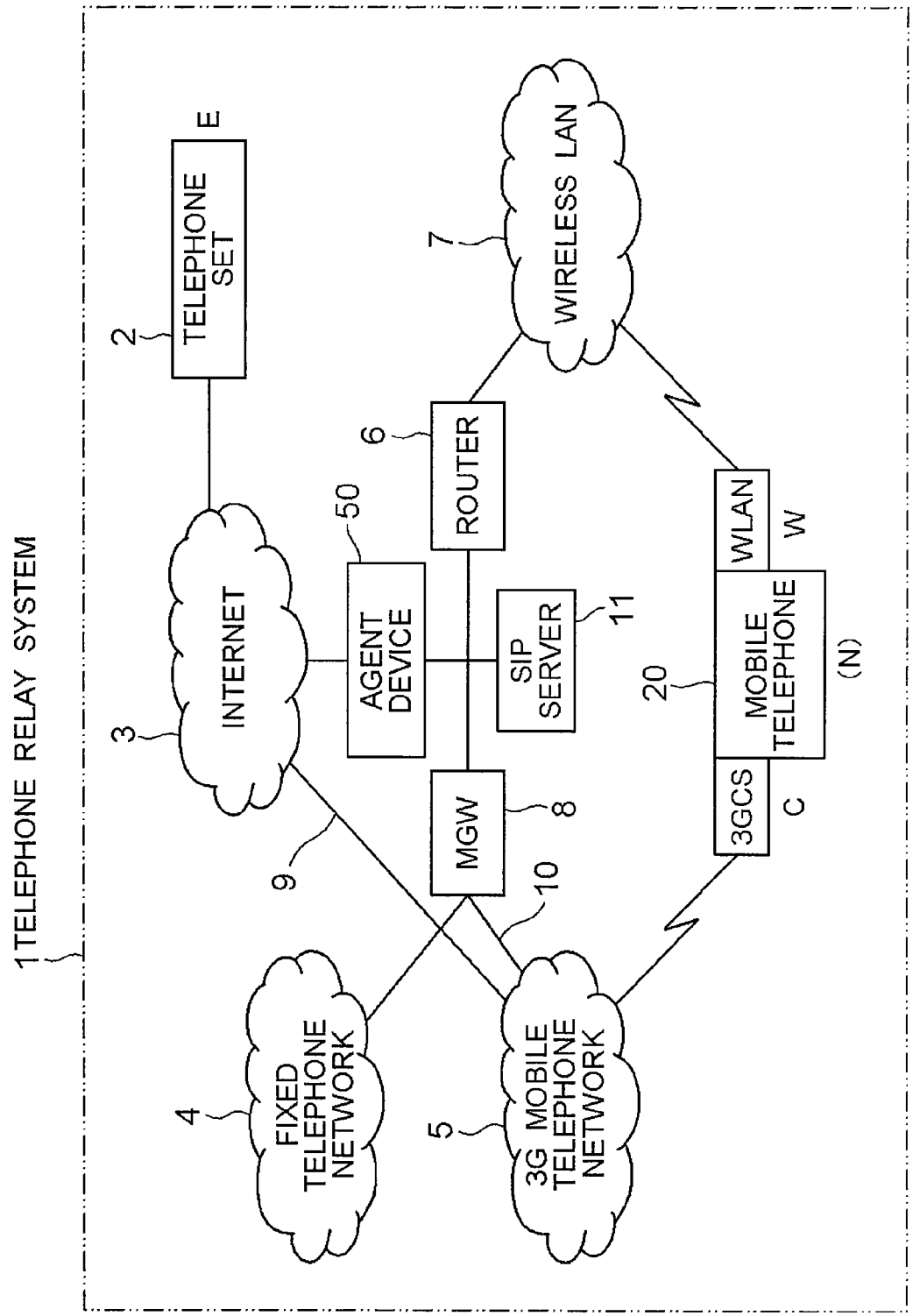
FIG. 1 is an overall view of a telephone relay system according to an embodiment 1 of the present invention.

As shown in FIG. 1, a telephone relay system according to an embodiment 1 includes, as communication networks, the Internet 3, a 3G mobile telephone network 5, a fixed telephone network 4 and a wireless LAN 7. Further, the telephone relay system 1 according to the embodiment 1 includes a telephone line switching apparatus for performing relay between a primary terminal (i.e., mobile telephone) 20 to which telephone numbers are assigned corresponding to a plurality of telephone networks and a counterpart terminal 2 (i.e. telephone set), as shown in FIG. 1.

Figure 2:
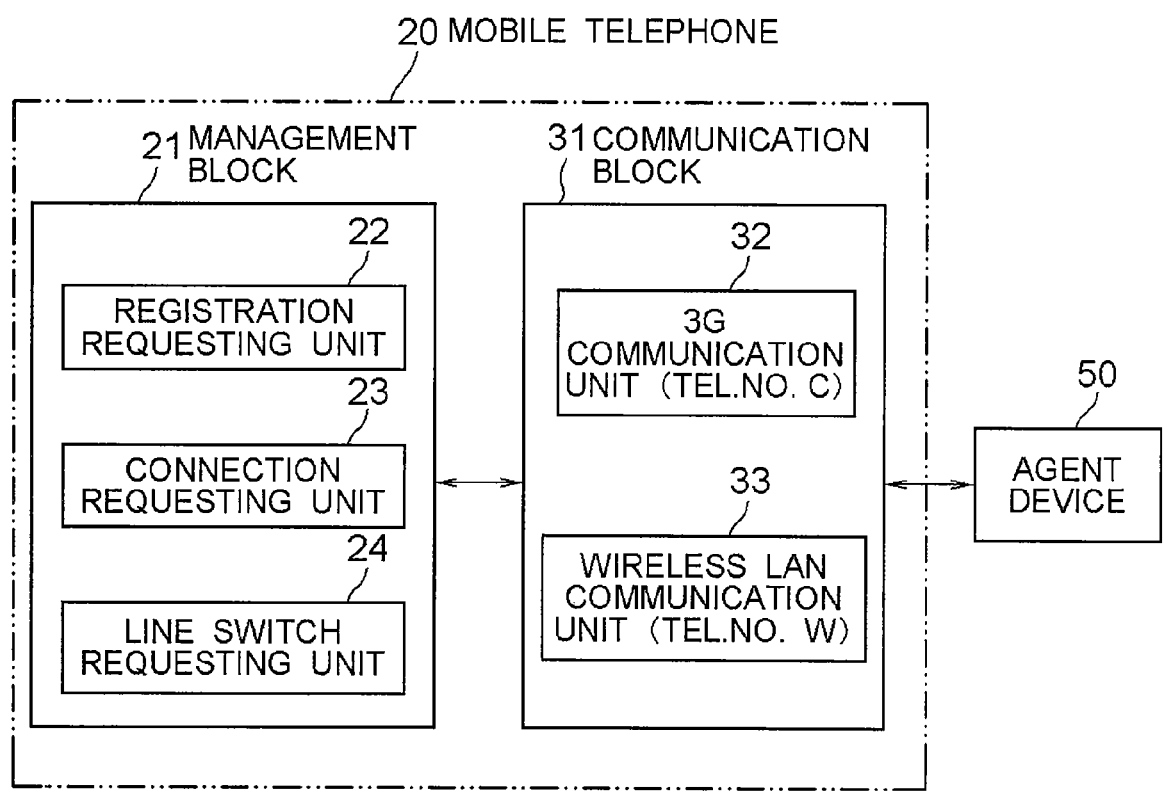
FIG. 2 is a function block diagram of a mobile telephone in FIG. 1.

The primary terminal 20 used in the telephone line switching apparatus can be line-connected with the counterpart terminal using different telephone numbers, but in the example shown in FIG. 1, it is a telephone set which is compatible with two systems of a third generation mobile telephone (3G mobile telephone) and an IP telephone, and includes a management block 21 as shown in FIG. 2.

The primary terminal 20 is capable of connecting to the 3G mobile telephone network 5 and to the wireless LAN 7 respectively, in which a telephone number C as a mobile telephone supporting 3G and a telephone number W as an IP telephone set are allocated thereto. Further, to the primary terminal 20, a common telephone number N is allocated, irrespective of network connections over the 3G mobile telephone network 5 and the wireless LAN 7. When a network connection is established between the primary terminal 20 and a device of the counterpart such as a counterpart terminal 2, the counterpart terminal 2 does not recognize the telephone numbers C or W but recognizes the common telephone number N as the telephone number of the primary terminal 20.

The telephone line switching apparatus includes an agent device 50 which switches telephone networks. The management block 21 of the primary terminal 20 transmits a control instruction regarding network connection to the agent device 50 over a packet switching network (PS) 9 of the 3G mobile telephone network 5 and the Internet 3.

Based on the control instruction transmitted from the management block 21 of the primary terminal 20, the agent device 50 establishes a network connection between the primary terminal 20 and the counterpart terminal 2 using the telephone number N common to the telephone numbers (C, W) allocated corresponding to the telephone networks. More specifically, when the agent device 50 receives a control instruction regarding network connection transmitted from the management block 21 of the primary terminal 20, the agent device 50 calls the primary terminal 20 using the telephone number (C or W) currently associated with primary terminal 20, and also calls the counterpart terminal 2 using the common telephone number N.

When the agent device 50 receives a call from the counterpart terminal 2 with the common telephone number N, the agent device 50 calls the primary terminal 20 using the telephone number currently associated with the primary terminal instead of the common telephone number N. When a control instruction to change the telephone network, to which the primary terminal 20 is line-connected, is transmitted from the management block 21, the agent device 50 calls the primary terminal 20 using another telephone number.

When the primary terminal 20 makes a call to the counterpart terminal 2 using the telephone number C for 3G, the primary terminal 20 is line-connected to the agent device 50 via the 3G mobile telephone network 5 and the media gateway (MGW) 8. When the primary terminal 20 makes a call to the counterpart terminal 2 using the telephone number W for IP telephone, the primary terminal 20 is line-connected to the agent device 50 via the wireless LAN 7 and the router 6. In either case, the agent device 50 relays a call between the primary terminal 20 and the counterpart terminal 2.

The SIP server 11 manages sessions (calling) between the primary terminal 20 and the agent device 50, and between the agent device 50 and the counterpart terminal 2 by a protocol based on SIP defined in RFC (Request for Comments) 3261.

The 3G mobile telephone network 5 includes the packet switching network (PS) 9 and the line switching network (CS) 10. The packet switching network 9 directly connects to the Internet 3, and the line switching network 10 connects to the Internet 3 via the media gateway 8.

Next, a specific example using a mobile telephone compatible with two systems of a third generation mobile telephone system (3G mobile telephone) and an IP telephone will be described based on FIG. 2.

As shown in FIG. 2, the primary terminal 20 includes the management block 21 which manages communications, and a communication block 31 which actually performs communications. The management block 21 includes a registration requesting unit 22, a connection requesting unit 23, and a line switch requesting unit 24. The communication block 31 includes a 3G communication unit 32 and a wireless LAN communication unit 33.

The registration requesting unit 22 transmits a registration request packet to the agent device 50 for requesting registration of one of the telephone numbers C and W as a telephone number to be used currently (current telephone number), over the packet switching network 9 of the 3G mobile telephone network 5 and the Internet 3.

When the primary terminal 20 calls the counterpart terminal 2, the connection requesting unit 23 transmits a connection request packet to the agent device 50 for requesting network connection, over the packet switching network 9 of the 3G mobile telephone 5 and the Internet 3.

When a call is made between the primary terminal 20 and the counterpart terminal 2, the line switch requesting unit (line switching request transmission unit) 24 transmits a line switch requesting packet to the agent device 50 to request for switching a network to be used, over the packet switching network 9 of the 3G mobile telephone network 5 and the Internet 3.

In the 3 G communication unit 32, a 3G mobile telephone protocol is installed. Using the 3G mobile telephone protocol, the 3 G communication unit 32 performs communications between the primary terminal 20 and the agent device 50 over the 3G mobile telephone network 5. The 3 G communication unit 32 can perform communications over packet switching network 9 and the line switching network 10 simultaneously.

In the wireless LAN communication unit 33, wireless LAN protocols such as IEEE (Institute of Electrical and Electronic Engineers) 802.11a and TCP/IP (Transmission Control Protocol/Internet Protocol) are installed, and using such protocols, the wireless LAN communication unit 33 performs communications between the primary terminal 20 and the agent device 50 over the wireless LAN 7.

Next, a specific example of the agent device 50 will be described based on FIG. 3.

The agent device 50 includes a management block 51 which manages communications, a communication control block 61 which performs communications, and a memory 71. The management block 51 includes a number obtainment unit 52, a connection managing unit 53 and a line switching unit 54. The communication control block 61 includes a communication unit 62 and a communication relay unit 63.

The number obtainment unit 52 receives a registration request packet from the primary terminal 20, obtains the telephone number C or W currently used by the primary terminal 20 from the mobile telephone 20, associates it with the common telephone number N, and registers them in a telephone number database 72 of the memory 71.

When a connection request is provided by the primary terminal 20 to the counterpart terminal 2, the connection management unit 53 calls both the primary terminal 20 and the counterpart terminal 2 via the SIP server 11, and establishes two call sessions between the primary terminal 20 and the agent device 50 (terminal-side connection) and between the agent device 50 and the counterpart terminal 2 (counterpart-side connection). Further, when the counterpart terminal 2 calls the primary terminal 20, the connection management unit 53 responds to the call, and also calls the primary terminal 20 to establish two call sessions between the counterpart terminal 2 and the agent device 50 and between the agent device 50 and the primary terminal 20.

In other words, the connection management unit 53 serves as a terminal calling unit, a counterpart calling unit, a call origination unit and an incoming call handling unit.

When the line switching unit 54 receives a line switch requesting packet from the primary terminal 20, it disconnects the network used for the call and connects the other network.

In the communication unit 62, LAN protocols such as IEEE 802.3 and TCP/IP are installed, and using these protocols, the communication unit 62 performs communications among the primary terminal 20, the MGW 8 and the SIP server 11.

The communication relay unit 63 transfers data received through one of the two call sessions established by the connection management unit 53 and the communication unit 62 to the other one, and establishes a call between the primary terminal 20 and the counterpart terminal 2.

The telephone number database (DB) 72 in the memory 71 stores the telephone number C or W currently used by the primary terminal 20 and the common telephone number N of the primary terminal 20 while associating them with each other. FIG. 4 shows exemplary data stored on the telephone number DB 72. One line in FIG. 4 indicates data corresponding to one mobile telephone, in which the first column stores a common telephone number and the second column stores a current telephone number. For example, the first line (excluding the title line) in the table indicates that a mobile telephone, to which a common telephone number N1 is allocated, currently uses a telephone number C1 of a 3G mobile telephone.

Figure 5:
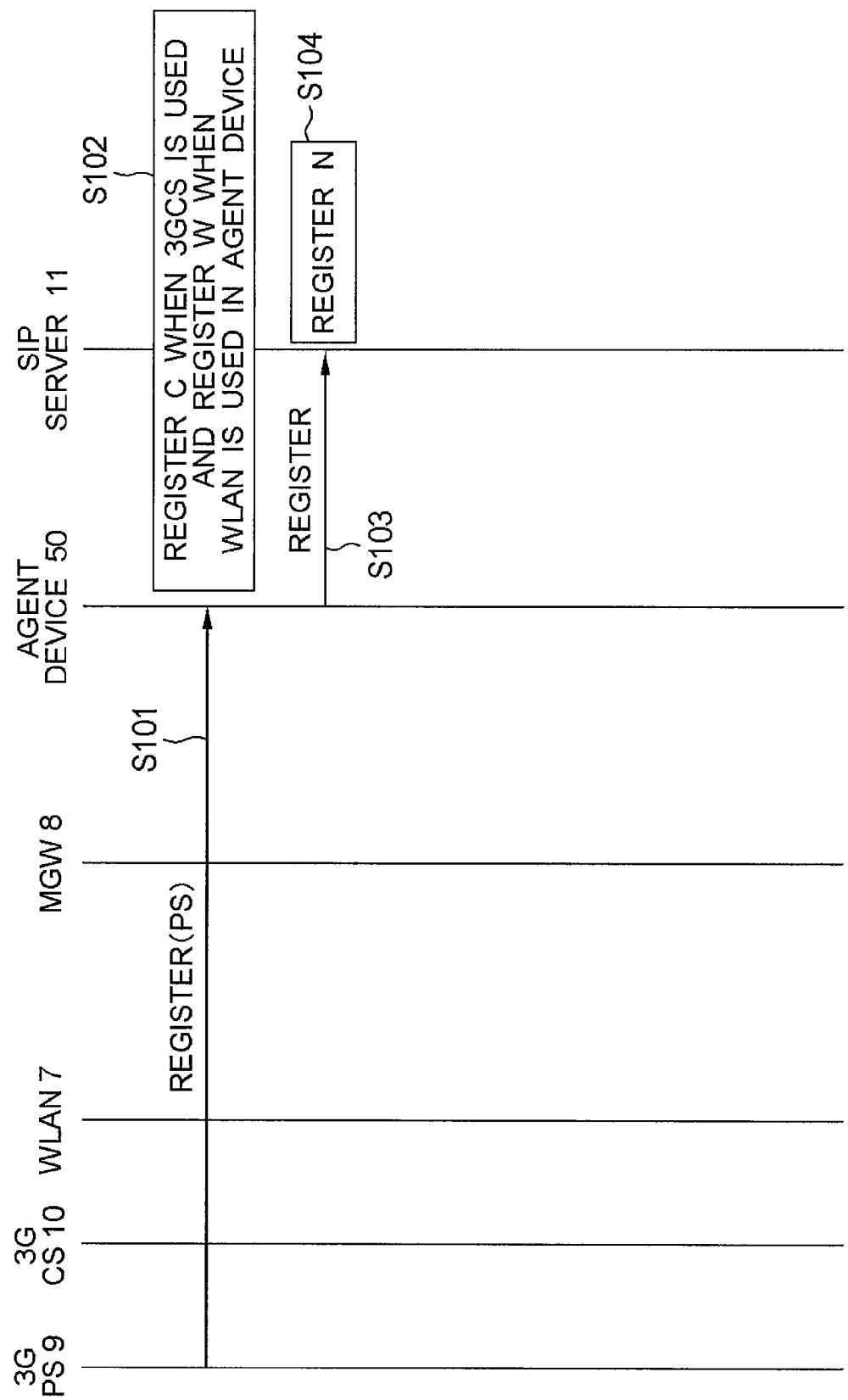
FIG. 5 is a sequence diagram showing a telephone number registering operation of the telephone relay system in FIG. 1.

The process leading to the registration of the current telephone number in the agent device 20 is shown in FIG. 5.

When the primary terminal 20 is powered or a used network is switched (e.g., exiting the service area when using the wireless LAN 7), the primary terminal 20 transmits a registration request packet (REGISTER(PS)) to the agent device 50 over the packet switching network 9 of the 3G mobile telephone network 5 and the Internet 3 (step S101). The registration request packet includes the common telephone number N allocated to the primary terminal 20 and the telephone number C or W currently used by the primary terminal 20.

When the agent device 50 receives the registration request packet (REGISTER(PS)) from the primary terminal 20, it registers the telephone number C or W in the telephone number database 72 (step S102), and transmits the registration request packet (REGISTER) of the common number N to the SIP server 11 (step S103). The registration request from the agent device 50 to the SIP server 11 (REGISTER in step S103) is performed in accordance with SIP.

When the SIP server 11 receives the registration request packet (REGISTER) from the agent device 50, it registers the common telephone number N in the database of itself (step S104).

Figure 6:
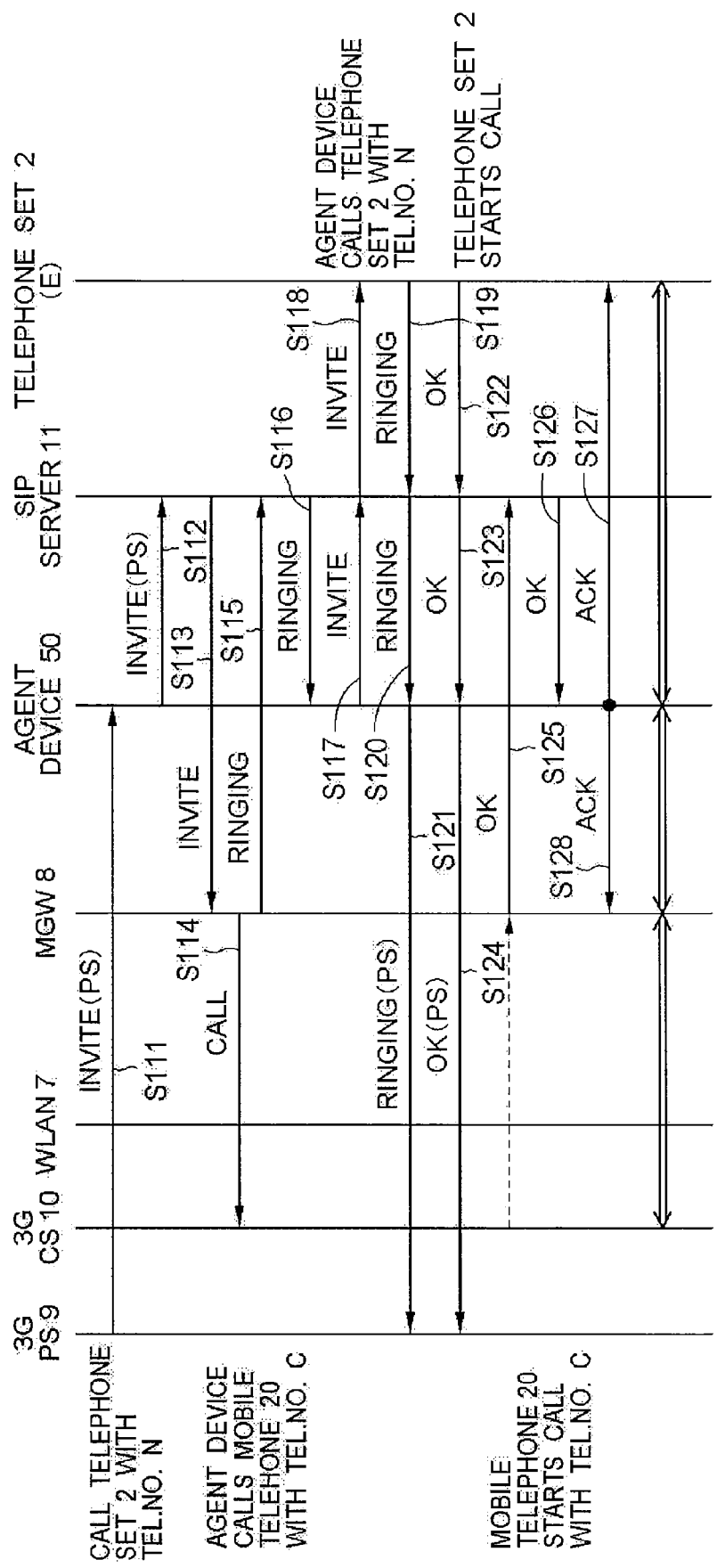
FIG. 6 is a sequence diagram showing an operation when originating a call of the telephone relay system in FIG. 1.

The process leading to the connection of the primary terminal 20 to the counterpart terminal 2 over the 3G mobile telephone network 5 with telephone number C is shown in FIG. 6.

The primary terminal 20 transmits a request packet for line connection (INVITE(PS)) using the telephone number C to the agent device 50 over the packet switching network 9 of the 3G mobile telephone network 5 and the Internet 3 (step S111).

When the agent device 50 receives the connection request packet, it transmits a request packet for line connection (INVITE(PS)) to the SIP server 11 (step S112). When the SIP server 11 receives the request packet for line connection (INVITE(PS)) from the agent device 50, it determines the packet as a line connection request from the primary terminal 20, and transmits a line connection packet (INVITE) to the media gateway 8 (step S113).

When the media gateway 8 receives the line connection packet (INVITE) from the SIP server 11, it transmits a call origination packet (CALL) with the telephone number C to the primary terminal 20 over the line switching network 10 and the 3G mobile telephone network 5 (step S114), and also transmits a calling packet (RINGING) indicating that the primary terminal 20 is called to the SIP server 11 (step S115).

When the SIP server 11 receives the calling packet (RINGING) from the media gateway 8, it transmits a calling packet (RINGING) indicating that the primary terminal 20 is called with the telephone number C to the agent device 50 (step S116).

When the agent device 50 receives the calling packet (RINGING) with the telephone number C from the SIP server 11, it searches for a common telephone number stored in association with the telephone number C by referring to the telephone number database 72. In this case, the telephone number C is previously registered in the telephone number database 72, and further, a common telephone number associated with the registered telephone number C is "N". The agent device 50 determines that a common telephone number associated with the telephone number C is "N", and reads out the common telephone number N from the telephone number database 72, and transmits a line connection request (INVITE) with the common telephone number N to the SIP server 11 (step S117).

When the SIP server 11 receives the line connection request (INVITE) with the common telephone number N from the agent device 50, it transmits a call origination packet (INVITE) with the common telephone number N to the counterpart terminal 2 via the agent device 50 (step S118). When the agent device 50 calls the counterpart terminal 2 with the common telephone number N, a calling packet (RINGING) indicating that the counterpart terminal 2 is called is inputted into the SIP server 11 (step S119), and the calling packet (RINGING) is transmitted to the agent device 50 (step S120). When the agent device 50 receives the calling packet (RINGING in step S120), it transmits a calling packet (INVITE(PS)) with the telephone number C to the primary terminal 20 over the Internet 3 and the packet switching network 9 (step S121).

In the sequence described above, when the counterpart terminal 2 is picked-up, a response packet (OK) indicating a response to the call is transmitted from the counterpart terminal 2 to the SIP server 11 (step S122). When the SIP server 11 receives the response packet (OK) from the counterpart terminal 2, it transfers the response packet (OK) to the agent device 50 (step S123). When the agent device 50 receives the response packet (OK), it transmits the response packet (OK) to the primary terminal 20 over the Internet 3 and the packet switching network 9 (step S124).

When the primary terminal 20 receives the response packet (OK), the response packet (OK) is transmitted to the media gateway 8 over the line switching network 10 (dotted arrow line). When the media gateway 8 receives the response packet (OK) over the line switching network 10, it transmits the response packet (OK) to the SIP server 11 (step S125). When the SIP server 11 receives the response packet (OK) from the media gateway 8, it transmits the response packet (OK) to the agent device 50 (step S126).

When the agent device 50 receives the response packet (OK) from the SIP server 11, it transmits an acknowledge packet (ACK) indicating the completion of line connection to the media gateway 8 and to the counterpart terminal 2 (step S127, step S128). Thereby, a connection is established between the primary terminal 20 and the agent device 50 via the media gateway 8, the line switching network 10 and the 3G mobile telephone network 5, and a connection is established between the agent device 50 and the counterpart terminal 2, whereby the primary terminal 20 and the counterpart terminal 2 are line-connected via the agent device 50 (double arrow line).

Figure 7:
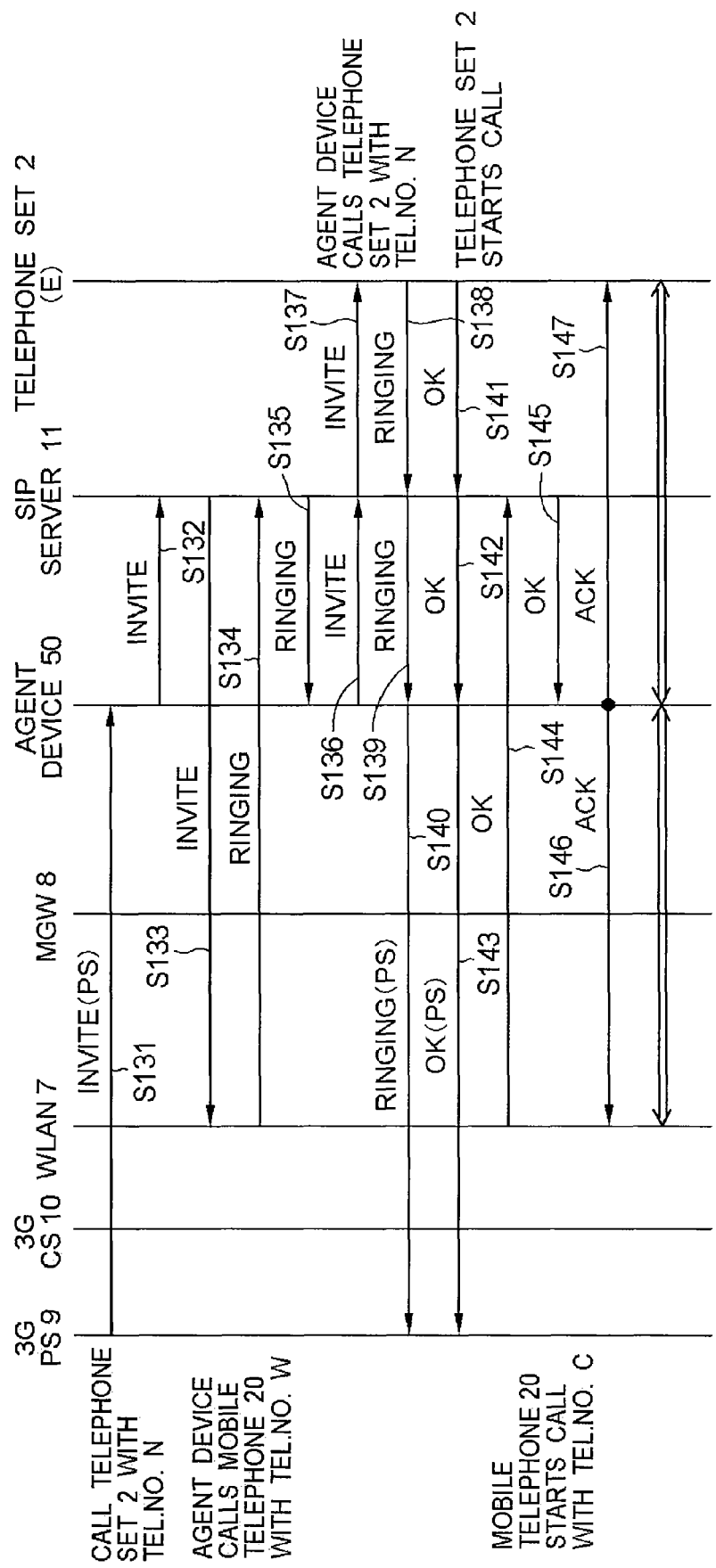
FIG. 7 is a sequence diagram showing an operation when originating a call of the telephone relay system in FIG. 1.

The process leading to the connection of primary terminal 20 to counterpart terminal 2 with telephone number W via the wireless LAN 7 and router 6 is shown in FIG. 7.

The primary terminal 20 transmits a request packet (INVITE(PS)) for line connection using the telephone number W to the agent device 50 over the packet switching network 9 of the 3G mobile telephone network 5 and the Internet 3 (step S131).

When the agent device 50 receives the connection request packet (INVITE(PS)), it transmits a request packet (INVITE)

for line connection to the SIP server 11 (step S132). When the SIP server 11 receives the request packet (INVITE) for line connection from the agent device 50, it determines that the packet is a line connection request from the primary terminal 20, so it transmits a line connection packet (INVITE) to the wireless LAN 7 (step S133).

When the wireless LAN 7 receives the line connection packet (INVITE) from the SIP server 11, it transmits a calling packet (RINGING) indicating that the primary terminal 20 is called with the telephone number W to the SIP server 11 (step S134). When the SIP server 11 receives the calling packet (RINGING) from the wireless LAN 7, it transmits the calling packet (RINGING) to the agent device 50 (step S135).

When the agent device 50 receives the calling packet (RINGING) with the telephone number W from the SIP server 11, it refers to the telephone number database 72 so as to search for the common telephone number stored in association with the telephone number W. In this case, the telephone number W is previously registered in the telephone number database 72, and a common telephone number associated with the registered telephone number W is "N". The agent device 50 determines that the common telephone number associated with the telephone number W is "N", so it reads out the common telephone number N from the telephone number database 72, and transmits a line connection request (INVITE) with the common telephone number N to the SIP server 11 (step S136).

When the SIP server 11 receives the line connection request (INVITE) with the common telephone number N from the agent device 50, it transmits an origination packet (INVITE) with the common telephone number N to the counterpart terminal 2 via the agent device 50 (step S137).

When the agent device 50 calls the counterpart terminal 2 with the common telephone number N, a calling packet (RINGING) indicating that the counterpart terminal 2 is called is inputted into the SIP server 11 (step S138), and the calling packet (RINGING) is transmitted to the agent device 50 (step S139). When the agent device 50 receives the calling packet (RINGING in step S139), it transmits a calling packet (INVITE(PS)) with the telephone number W to the primary terminal 20 over the Internet 3 and the packet switching network 9 (step S140).

In the sequence described above, when the counterpart terminal 2 is picked-up, a response packet (OK) indicating calling response to the call is transmitted from the counterpart terminal 2 to the SIP server 11 (step S141). When the SIP server 11 receives response packet (OK) from the counterpart terminal 2, it transfers the response packet (OK) to the agent device 50 (step S142). When the agent device 50 receives the response packet (OK), it transmits the response packet (OK) to the primary terminal 20 over the Internet 3 and the packet switching network 9 (step S143).

The wireless LAN 7 transmits a response packet (OK), indicating that the primary terminal 20 is in a responding state, to the SIP server 11 (step S144). When the SIP server 11 receives the response packet (OK) from the wireless LAN 7, it transmits the response packet (OK) to the agent device 50 (step S145). When the agent device 50 receives the response packet (OK) from the SIP server 11, it transmits an acknowledge packet (ACK) indicating the completion of line connection to the wireless LAN 7 and to the counterpart terminal 2 (step S146, step S147). Thereby, a connection is established between the primary terminal 20 and the agent device 50 via the wireless LAN 7 and the router 6, and a connection is established between the agent device 50 and the counterpart terminal 2, whereby the primary terminal 20 and the counterpart terminal 2 is line-connected via the agent device 50 (double arrow line).

Figure 8:
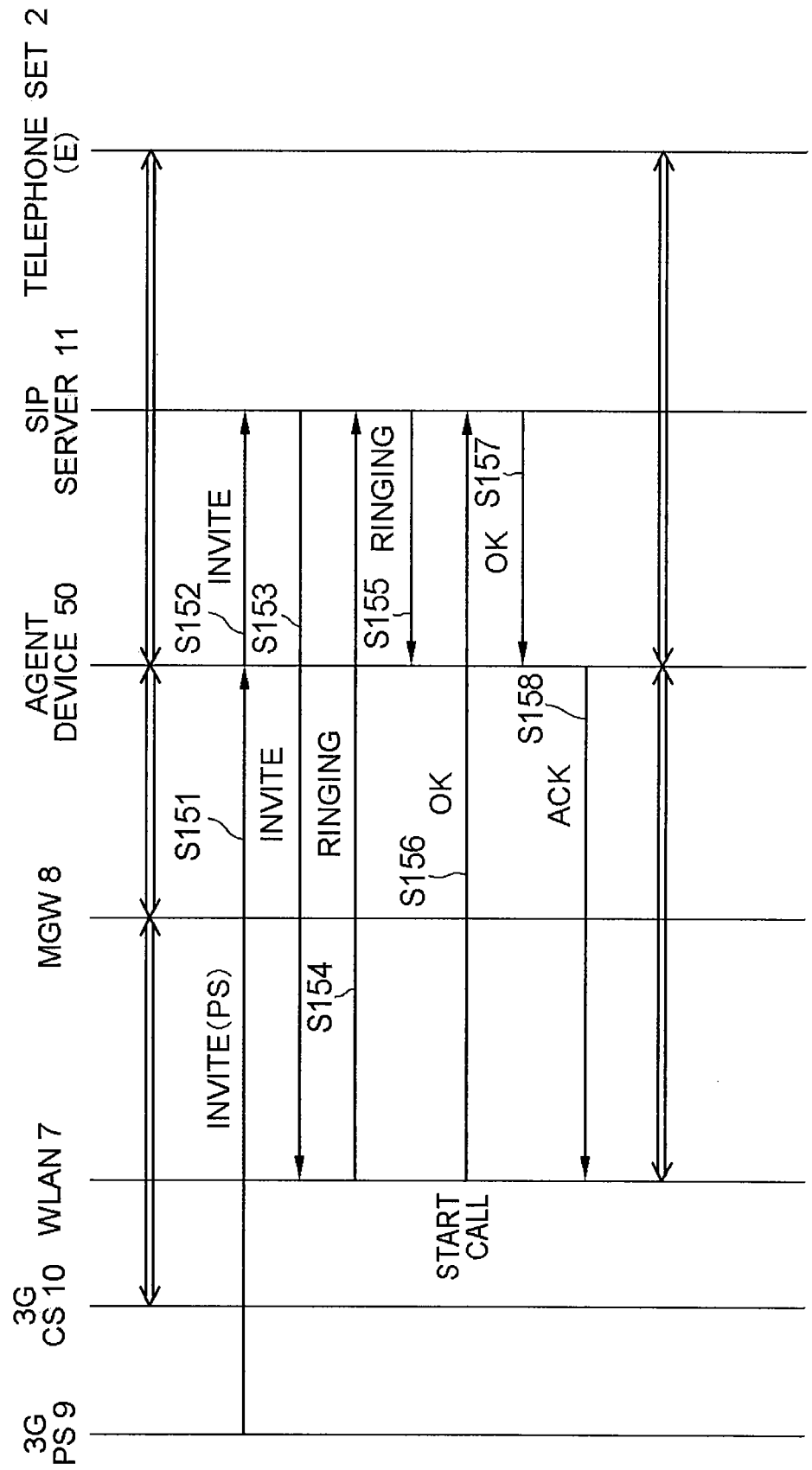
FIG. 8 is a sequence diagram showing a line switching operation of the telephone relay system in FIG. 1.

The process of switching the used network to the wireless LAN 7 during a call between the primary terminal 20 and the counterpart terminal 2 using the 3G mobile telephone network 5 (double arrow line in FIG. 8) is shown in FIG. 8.

The primary terminal 20 transmits a line switch requesting packet (INVITE(PS)) requesting line switching to the agent device 50 (step S151). When the agent device 50 receives the line switch requesting packet (INVITE(PS)), it transmits a line switch requesting packet (INVITE) to the SIP server 11 (step S152). When the SIP server 11 receives the line switch requesting packet (INVITE) from the agent device 50, it transmits the line switch requesting packet (INVITE) to the wireless LAN 7 (step S153). When the wireless LAN 7 receives the line switch requesting packet (INVITE) from the SIP server 11, it calls the primary terminal 20 with the telephone number W, and transmits a calling packet (RINGING) indicating that the primary terminal 20 is called to the SIP server 11 (step S154). When the SIP server 11 receives the calling packet (RINGING) from the wireless LAN 7, it transmits the packet to the agent device 50 (step S155).

If the primary terminal 20 responds in this state, a response packet (OK) is transmitted from the wireless LAN 7 to the SIP server 11 (step S156), and the SIP server 11 transmits the response packet (OK) to the agent device 50 (step S157). At the point that the agent device 50 receives the response packet (OK) from the SIP server 11, the agent device 50 transmits an acknowledge packet (ACK) indicating the completion of line connection to the wireless LAN 7 (step S158).

Thereby, a connection is established between the primary terminal 20 and the agent device 50 via the wireless LAN 7 and the router 6, and a connection is established between the agent device 50 and the counterpart terminal 2, whereby the primary terminal 20 and the counterpart terminal 2 are line-connected via the agent device 50 (double arrow line).

Figure 9:
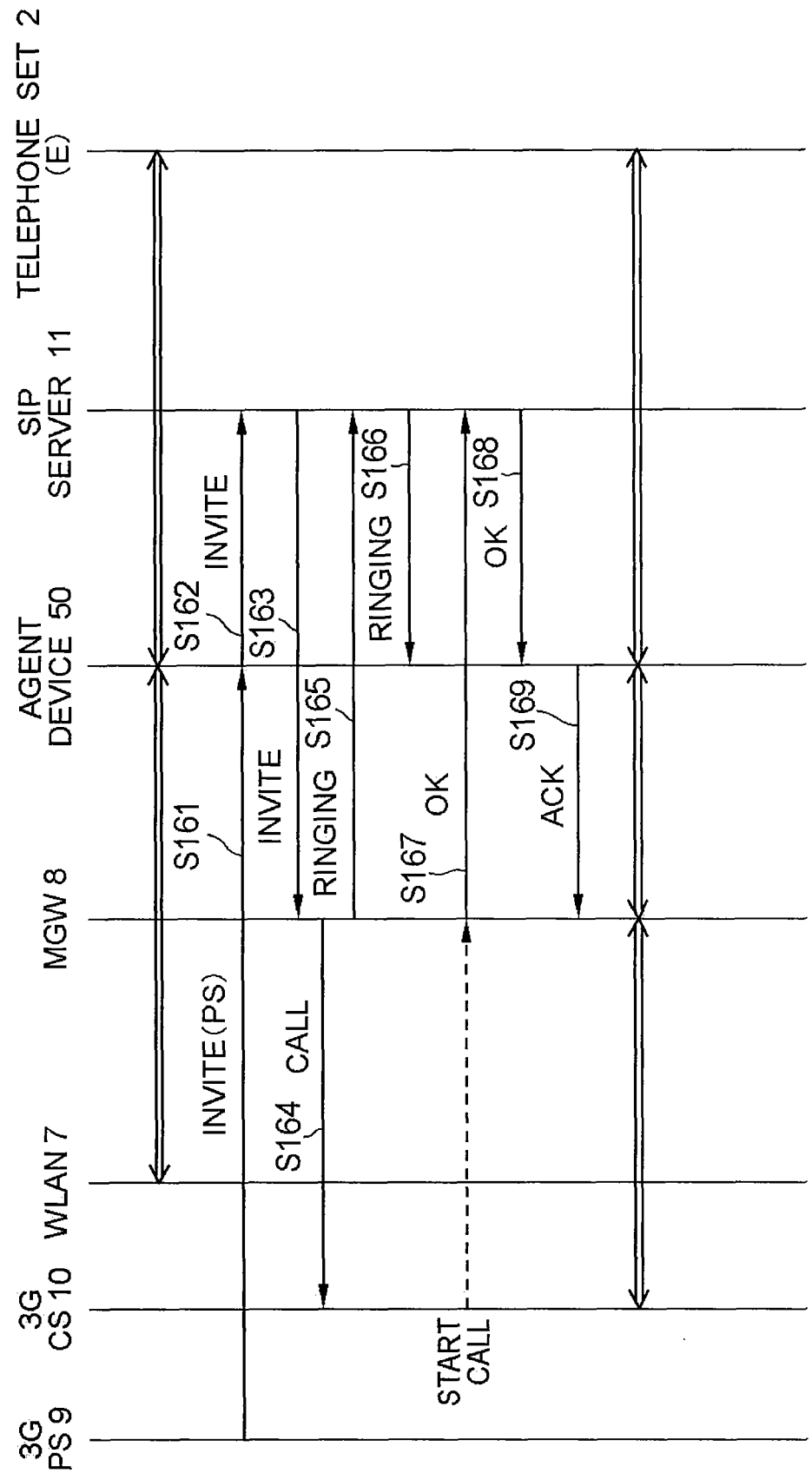
FIG. 9 is a sequence diagram showing a line switching operation of the telephone relay system in FIG. 1.

The process of switching the used network to the 3G mobile telephone network 5 during a call between the primary terminal 20 and the counterpart terminal 2 using the wireless LAN 7 (double arrow line in FIG. 9) is shown in FIG. 9.

The primary terminal 20 transmits a line switch requesting packet (INVITE(PS)) requesting line switching to the agent device 50 (step S161). The agent device 50 transmits a line switch requesting packet (INVITE) to the SIP server 11 (step S162). When the SIP server 11 receives the line switch requesting packet (INVITE) from the agent device 50, it transmits a call origination requesting packet (INVITE) with the telephone number C to the media gateway 8 (step S163). The media gateway 8 calls the primary terminal 20 with the telephone number C over the line switching network 10 (step S164), and also transmits a calling packet (RINGING) to the SIP server 11 (step S165). The SIP server transmits the calling packet (RINGING) from the media gateway 8 to the agent device 50 (step S166).

If the primary terminal 20 responds in this state, a response packet (OK) is transmitted from the media gateway 8 to the SIP server 11 (step S167), and the SIP server 11 transmits the response packet (OK) to the agent device 50 (step S168). At the point that the agent device 50 receives the response packet (OK) from the SIP server 11, the agent device 50 transmits an acknowledge packet (ACK) indicating the completion of line connection to the media gateway 8 (step S169).

Thereby, a connection is established between the primary terminal 20 and the agent device 50 over the 3G mobile telephone network 5, and a connection is established between the agent device 50 and the counterpart terminal 2, whereby the primary terminal 20 and the counterpart terminal 2 is line-connected via the agent device 50 (double arrow line).

Figure 10:
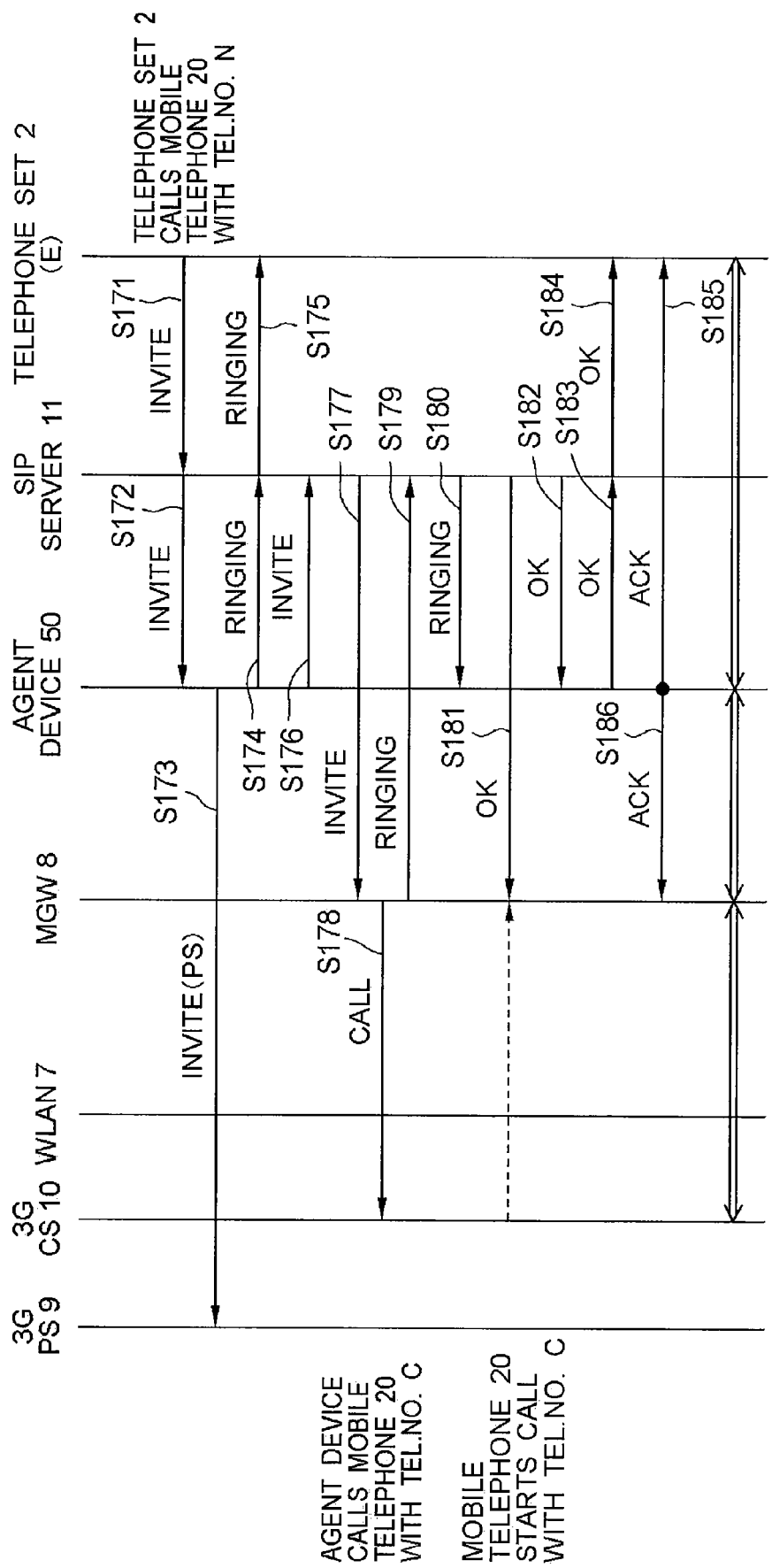
FIG. 10 is a sequence diagram showing an operation when a call arrives of the telephone relay system in FIG. 1.

The process of performing line-connection based on a call from the counterpart terminal 2, if the telephone number C for the 3G mobile telephone of the primary terminal 20 is registered in the agent device 50, is shown in FIG. 10.

When a user originates a call using the counterpart terminal 2 with the common telephone number N recognized as the telephone number of the primary terminal 20, a line connection requesting packet (INVITE) is transmitted from the counterpart terminal 2 to the SIP server 11 in accordance with the procedure of SIP (step S171). The line connection requesting packet (INVITE) is transferred to the agent device 50 by the SIP server 11 (step S172), and further, transferred to the primary terminal 20 by the agent device 50 over the packet switching network 9 of the 3G mobile telephone network 5 (step S173).

When the agent device 50 receives the line connection requesting packet (INVITE) from the SIP server 11, it transmits a calling packet (RINGING) for calling the counterpart terminal 2 to the SIP server 11 (step S174). When the SIP server 11 receives the calling packet (RINGING) indicating the calling from the agent device 11, it calls the counterpart terminal 2 over the Internet 3 (step S175).

When the agent device 50 transmits the calling packet (RINGING) to the SIP server 11, it transmits a line connection requesting packet (INVITE) to the SIP server 11. When the SIP server 11 receives the line connection requesting packet (INVITE) from the agent device 50, it transmits the line connection requesting packet (INVITE) to the media gateway 8 (step S177).

When the media gateway 8 receives the line connection requesting packet (INVITE) from the SIP server 11, it originates a call to the primary terminal 20 with the telephone number C (step S178) and transmits a calling packet (RINGING) indicating the calling to the SIP server 11 (step S179). When the SIP server 11 receives the calling packet (RINGING) from the media gateway 8, it transmits the calling packet (RINGING) to the agent device 50 (step S180).

Further, after the SIP server 11 transmits the calling packet (RINGING) indicating the calling to the agent device 50, when the primary terminal 20 starts a call with the telephone number C, the SIP server 11 transmits a response packet (OK) to the media gateway 8 (step S181), and also transmits a response packet (OK) to the agent device 50 (step S182).

The agent device 50 transmits the response packet (OK) to the SIP server 11 (step S183). When the SIP server 11 receives a response packet (OK), it transmits the response packet (OK) to the counterpart terminal 2. At the point when the processing described above has been completed, the agent device 50 transmits an acknowledge packet (ACK) to the media gateway 8 and the counterpart terminal 2 (step S185).

Thereby, a connection using the 3G mobile telephone network 5 is established between the primary terminal 20 and the agent device 50, and a connection is established between the agent device 50 and the counterpart terminal 2, whereby the primary terminal 20 and the counterpart terminal 2 are line-connected via the agent device 50 (double arrow line).

Figure 11:
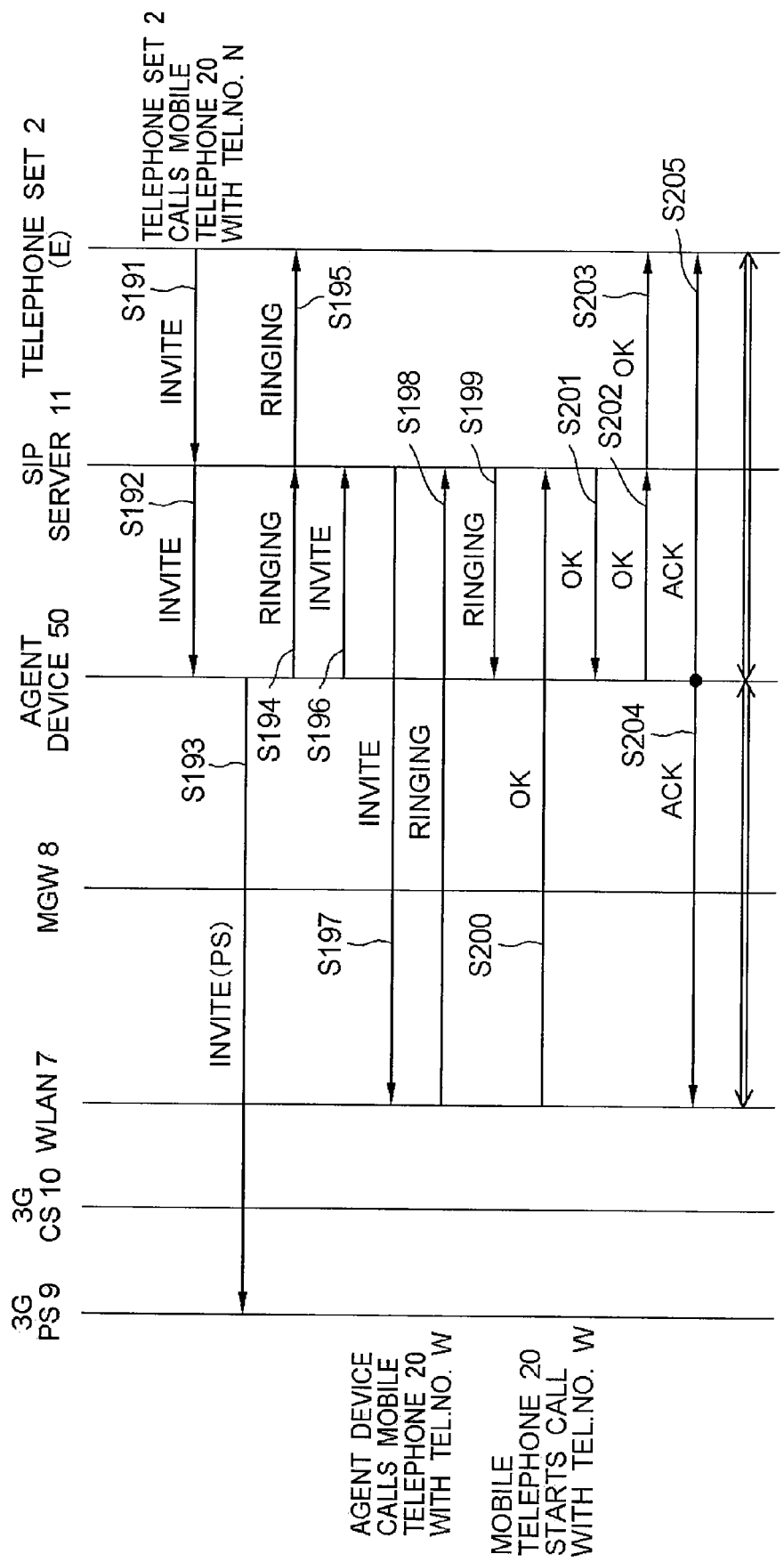
FIG. 11 is a sequence diagram showing an operation when a call arrives of the telephone relay system in FIG. 1.

The process of performing line connection based on a call from the counterpart terminal 2, when the telephone number W of the wireless LAN 7 of the primary terminal 20 has been registered in the agent device 50 is shown in FIG. 11.

When a user originates a call using the counterpart terminal 2 with the common telephone number N recognized as the telephone number of the primary terminal 20, a line connection requesting packet (INVITE) is transmitted from the counterpart terminal 2 to the SIP server 11 in accordance with the procedure of SIP (step S191). The line connection requesting packet (INVITE) is transferred to the agent device 50 by the SIP server 11 (step S192), and further, the line connection requesting packet (INVITE(PS)) is transferred to the primary terminal 20 by the agent device 50 over the packet switching network 9 of the 3G mobile telephone network 5 (step S193).

When the agent device 50 receives the line connection requesting packet (INVITE) from the SIP server 11, it transmits a calling packet (RINGING) for calling the counterpart terminal 2 to the SIP server 11 (step S194). When the SIP server 11 receives the calling packet (RINGING) from the agent device 11, it calls the counterpart terminal 2 over the Internet 3 (step S195).

When the agent device 50 transmits the calling packet (RINGING) indicating calling to the SIP server 11, it transmits a line connection requesting packet (INVITE) to the SIP server (step S194). When the SIP server 11 receives the line connection requesting packet (INVITE) from the agent device 50, it transmits the line connection requesting packet (INVITE) to the wireless LAN 7 (step S197).

When the wireless LAN 7 receives the line connection requesting packet (INVITE) from the SIP server 11, it originates a call to the primary terminal 20 with the telephone number W, and also transmits a calling packet (RINGING) to the SIP server 11 (step S198). When the SIP server 11 receives the calling packet (RINGING) from the wireless LAN 7, it transmits the calling packet (RINGING) to the agent device 50 (step S199).

When the primary terminal 20 responds, the wireless LAN 7 transmits a response packet (OK) to the SIP server 11 (step S200). The SIP server 11 transmits the response packet (OK) to the agent device 50 (step S201).

The agent device 50 transmits a response packet (OK) to the SIP server 11 (step S202). When the SIP server 11 receives the response packet (OK), it transmits the response packet (OK) to the counterpart terminal 2 (step S203). At the point that the processing described above has been completed, the agent device 50 transmits an acknowledge packet (ACK) to the wireless LAN 7 and the counterpart terminal 2 (step S205).

Thereby, a connection is established between the primary terminal 20 and the agent device 50 via the wireless LAN 7 and the router 6, and a connection is established between the agent device 50 and the counterpart terminal 2, whereby the primary terminal 20 and the counterpart terminal 2 are line-connected via the agent device 50 (double arrow line).

(Operation of Agent Device 50)

Figure 12:
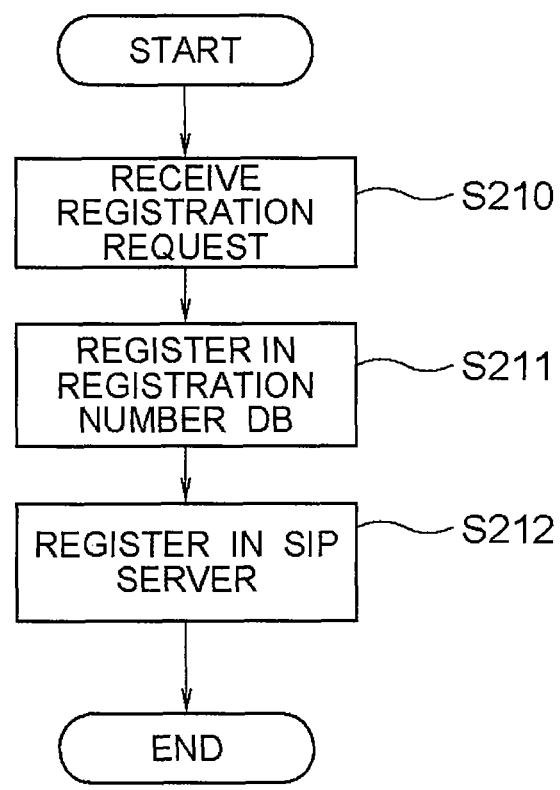
FIG. 12 is a sequence diagram showing a telephone number registering operation of the agent device in FIG. 1.

FIG. 12 is a flowchart showing the operation wherein agent device 50 registers a telephone number of primary terminal 20.

The communication unit 62 receives a registration request transmitted from the primary terminal 20 (step S210).

The number obtainment unit 52 obtains a telephone number which is included in the registration request and intended to be registered as the number that the primary terminal 20 uses currently, and stores it on the telephone number database 72 while associating it with the common telephone number of the mobile telephone which transmitted the registration request (step S211). The number obtainment unit 52 transmits the common telephone number of the primary terminal 20 which transmitted the registration request to the SIP server 11 via the communication unit 62, and registers it in the SIP server 11 (step S212). This registration is performed in accordance with SIP.

Figure 13:
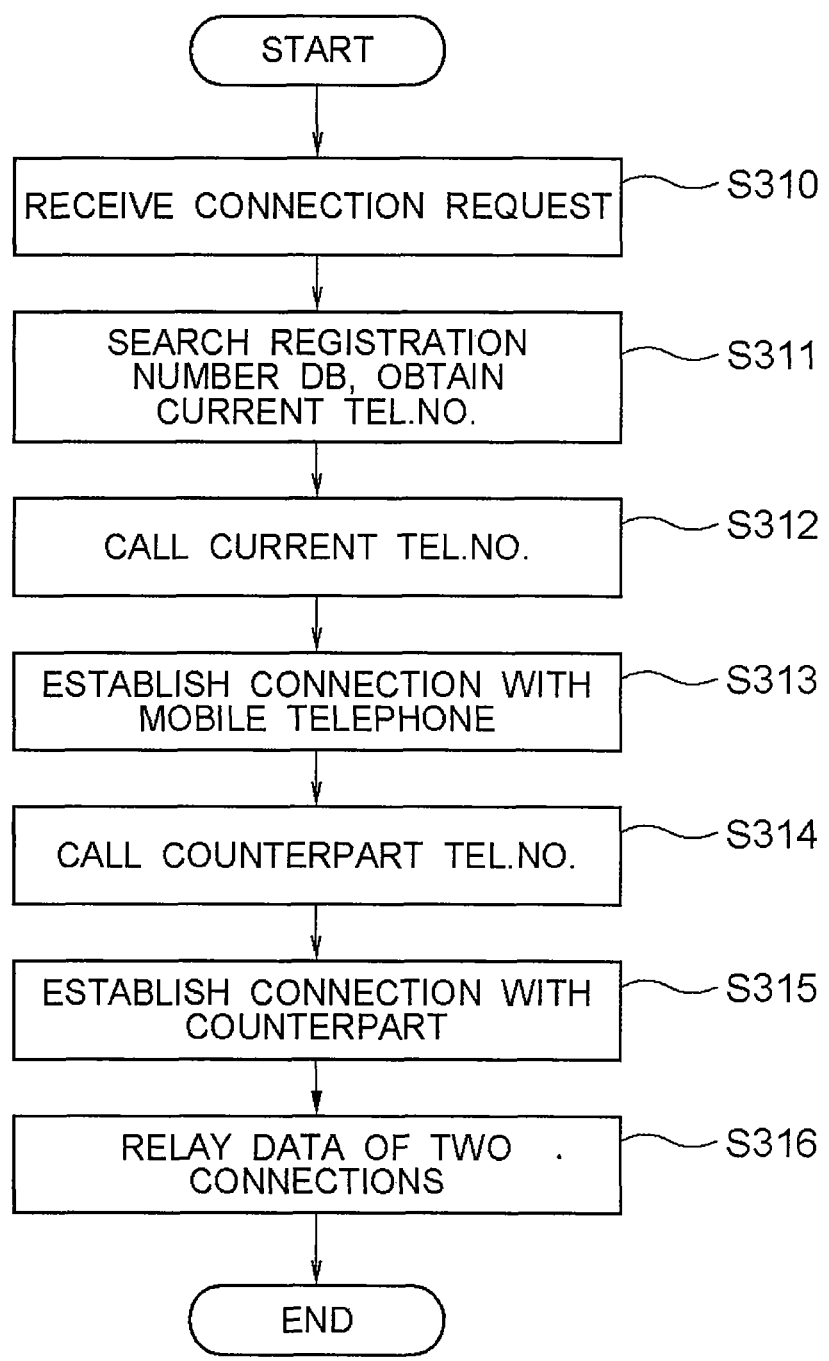
FIG. 13 is a sequence diagram showing an operation when originating a call of the agent device in FIG. 1.

FIG. 13 is a flowchart showing an operation when the agent device 50 receives a connection request from the primary terminal 20. The described functioning assumes that the telephone number C is registered in the telephone number database 72 as the current telephone number of the primary terminal 20.

The communication unit 62 receives a connection request from the primary terminal 20 (step S310). The connection request includes the common telephone number N of the primary terminal 20 and the telephone number E of the counterpart terminal 2 of the counterpart. The connection management unit 53 obtains the common telephone number N of the primary terminal 20 from the communication unit 62, and searches the registration database 72 using the number as the key to obtain the telephone number C (step S311). The connection management unit 53 calls the telephone number C via the communication unit 62 (step S312) and establishes a connection with the primary terminal 20 (step S313).

The connection management unit 53 also calls the telephone number E of the counterpart terminal 2 (step S314) to establish a connection with the counterpart terminal 2 (step S315). At this point, the telephone number of the originator sent to the counterpart terminal 2 is the common telephone number N.

Through the processing described above, two connections are established between the primary terminal 20 (telephone number C) and the agent device 50 and between the agent device 50 and the counterpart terminal 2. The communication relay unit 53 transmits data received in one of the two connections to the other one to relay communications between the primary terminal 20 and the counterpart terminal 2 (step S316).

Figure 14:
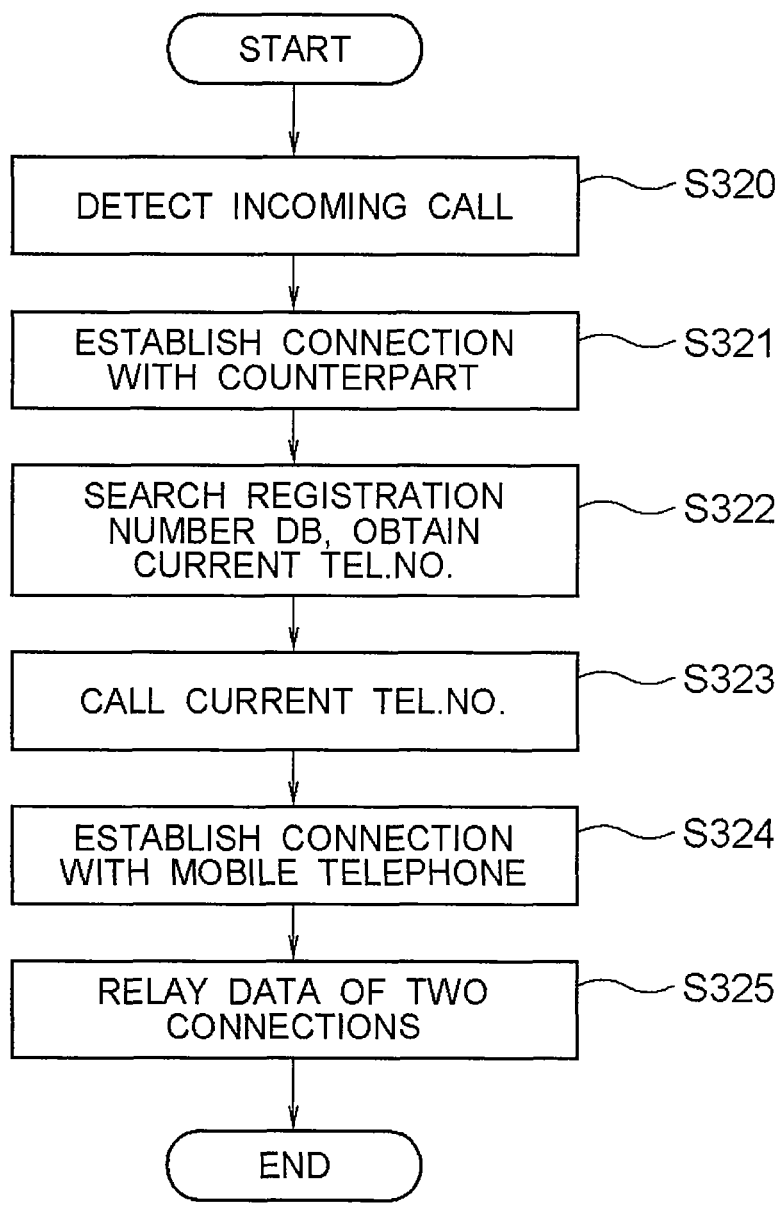
FIG. 14 is a sequence diagram showing an operation when a call arrives of the agent device in FIG. 1.

FIG. 14 is flowchart showing an operation when the agent device 50 detects an incoming call to the primary terminal 20. The described functioning assumes that the telephone number C is registered in the telephone number database 72 as the current telephone number of the primary terminal 20.

The communication unit 62 detects an incoming call to the primary terminal 20 from the counterpart terminal 2 (step S320). Note that the counterpart terminal 2 designates the common telephone number N as the telephone number of the primary terminal 20 irrespective of the number currently registered in the telephone number database 72. The communication management unit 53 establishes a connection with the counterpart terminal 2 responding to the incoming call (step S321).

The connection management unit 53 obtains the telephone number N included in the notification of incoming call from the communication unit 62, and searches the telephone number database 72 using the number as the key to obtain the telephone number C currently used by the primary terminal 20 (step S322). The connection management unit 53 calls the telephone number C via the communication unit 63 (step S323) to establish a connection with the primary terminal 20 (step S324).

The communication relay unit 63 relays communications between the primary terminal 20 and the counterpart terminal 2 in the similar manner as S316 in FIG. 14.

Figure 15:
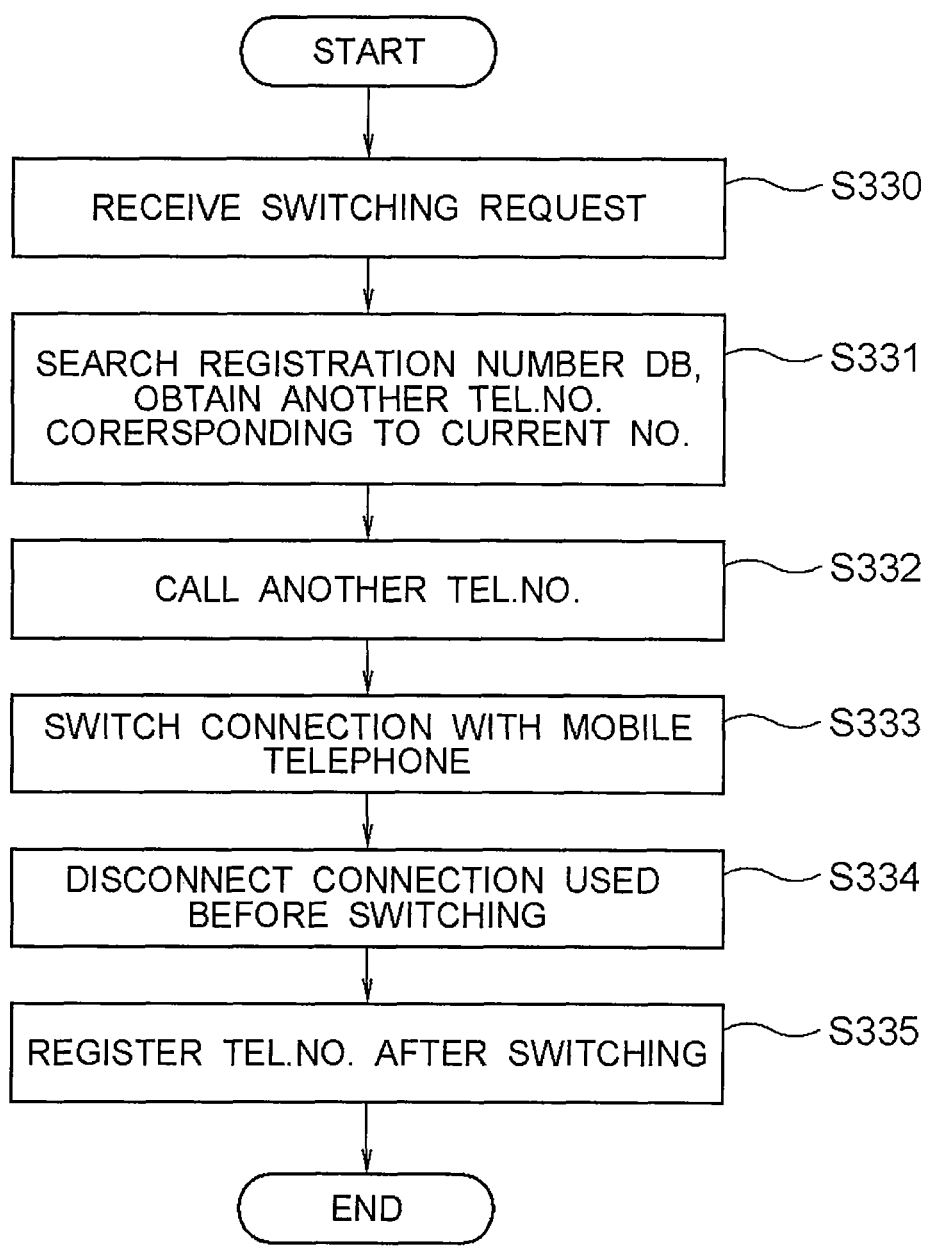
FIG. 15 is a sequence diagram showing a line switching operation of the agent device in FIG. 1.

FIG. 15 is a flowchart showing an operation when the agent device 50 receives a line switch request from the primary terminal 20. The described functioning assumes that a request is given to switch the used telephone number to W while primary terminal 20 is communicating with the counterpart terminal 2 using the telephone number C.

When the communication unit 62 receives a line switch request from the primary terminal 20 (step S330), the line switching unit 54 calls the telephone number W (step S331) to switch the connection between the primary terminal 20 and the agent device 50 (step S332).

When the switching is successful, the connection management unit 53 disconnects the connection between the primary terminal 20 and the agent device 50 using the telephone number C (step S333). The number obtainment unit 52 registers the telephone number W in the telephone number database 72 associating it with the common telephone number N (step S334).

In the description of the telephone relay system 1, it is assumed that primary terminal 20 can use the packet switching network 9 and the line switching network 10 simultaneously. If the primary terminal 20 cannot use the packet switching network 9 and the line switching network 10 simultaneously, the following method may be performed.
(Registration of Telephone Number)

The registration request unit 22 of the primary terminal 20 calls a telephone number 00AA-C via the 3 G communication unit 32 and the line switching network 10 (step S101 in FIG. 5). This call arrives at the agent device 50, and the number obtainment unit 52 extracts the telephone number C from the incoming-call number and the originator number, and registers the number in the telephone number database 72 associating it with the telephone number N (step S102 in FIG. 5).
(Line Switching)

When a line switch request is given during a call, the line switch requesting unit 24 of the primary terminal 20 notifies the agent device 50 of the telephone number W to be used after switching by a tone signal via the 3 G communication unit 32 and the line switching network 10 (step S151 in FIG. 8). The agent device 50 which obtained the telephone number W performs line switching through the same procedure as that in FIG. 8.
(Call from Primary Terminal 20)

The connection request unit 23 of the primary terminal 20 calls a telephone number 00AA-E via the 3 G communication unit 32 and the line switching network 10 (step S111 in FIG. 6). This call arrives at the agent device 50, and the connection management unit 53 extracts the telephone number C from the incoming-call number and the originator number, and calls the telephone number E and the telephone number C (steps S112, S117 in FIG. 6). Since a connection with the primary terminal 20 has been established at this point, a call of the telephone number C may be omitted.
(Call from Counterpart Terminal 2)

Since the telephone number C or W is registered in the telephone number database 72 associated with the telephone number N, when a call is made from the counterpart terminal 2, the agent device 50 mediates a call between the primary terminal 20 and the counterpart terminal 2 in the mannner shown in FIGS. 10 and 11.

Since the agent device 20 has the communication relay unit 63, it can mediate a call between the primary terminal 20 and the counterpart terminal 2 via two connections established by the connection management unit 53.

The originator telephone number, sent by the connection management unit 53 when a call origination request is made from the primary terminal 20, is the common telephone number N irrespective of the current telephone number. Further, when an incoming call is made to the common telephone number N, a connection between the primary terminal 20 and the agent device 50 is established using the current telephone number.

Therefore, the counterpart terminal 2 called from the primary terminal 20 (via the agent device 2) can recognize that it is called from a single telephone set having the common telephone number N when using either the telephone number C or telephone number W. When the counterpart terminal 2 calls the primary terminal 20, it is only necessary to designate the common telephone number N as the call destination without being aware of the current telephone number.

That is, according to the telephone relay system 1 of the present invention, it is possible to make the counterpart terminal 2 recognize the primary terminal 20 as a telephone device having a single telephone number N, and to conceal switching of the used network (and corresponding telephone number) by the primary terminal 20.

The primary terminal 20 includes the line switch requesting unit 24, and is capable of transmitting a line switch request to the agent device 50 during a call with the counterpart terminal 2. The line switching unit 54 of the agent device 50 responds to the line switch request, and establishes a connection between the primary terminal 20 and the agent device 50 using the current telephone number, and then disconnects the connection established before switching.

Therefore, it is possible to switch the network used for connection between the primary terminal 20 and the agent device 50 without interrupting the call. Such switching is effective when the primary terminal 20, for example, exits the service area of the wireless LAN 7 during a call with the counterpart terminal 2 using the wireless LAN 7 and telephone number W.

In the telephone relay system 1, the agent device 50 is disposed outside the 3G mobile telephone network 5 managed by a telecommunications carrier. Further, operations of call origination and call reception processing performed by the connection management unit of the agent device 50 is performed in accordance with existing protocols such as a 3G mobile telephone protocol and SIP.

Therefore, the telephone relay system 1 can be carried out without changing the existing communication networks, and further, it can be carried out by a part other than the telecommunications carriers managing the existing communication networks.

Embodiment 2

Next, configuration and operation of a telephone relay system 1a according to an a second embodimenmt of the present invention will be described. The configuration and operation of the telephone relay system 1a is the same as that of the telephone relay system 1 in FIG. 1 in many aspects Therefore, the following disclosure focuses on the differences between the disclosed embodiments.
(Configuration of Telephone Relay System 1a)

Figure 16:
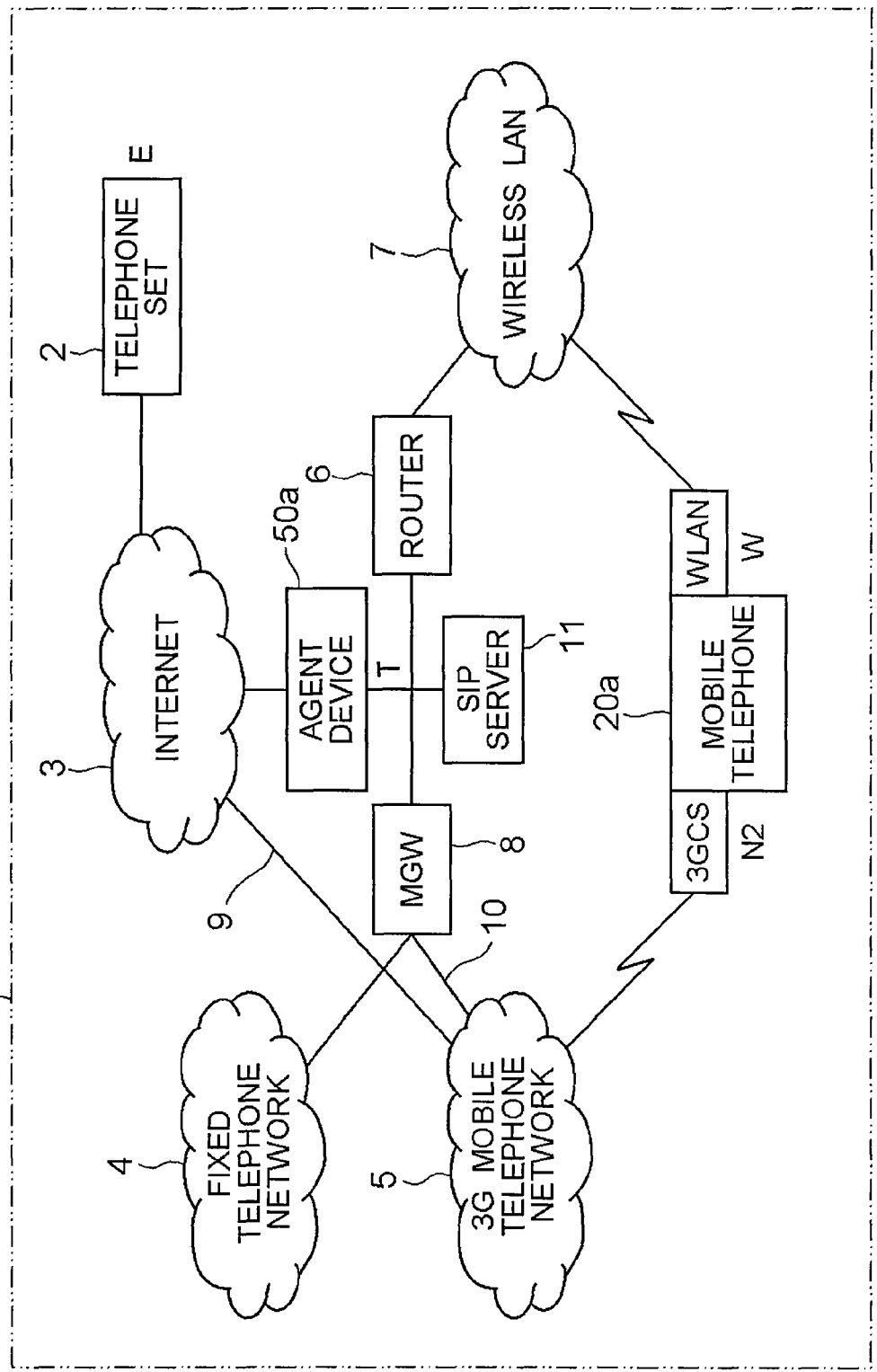
FIG. 16 is an overall view of a telephone relay system according to a second embodiment of the present invention.

FIG. 16 is an overall view showing the configuration of the telephone relay system 1a. As shown in FIG. 16, to a primary terminal 20a (i.e., mobile telephone), a telephone number N2 for a 3G mobile telephone and a telephone number W for a wireless LAN are allocated, and the telephone number N2 is used as a common telephone number. This differs from the first embodiment wherein the common telephone number N is allocated in addition to the two telephone numbers C and W.

A telephone number T is allocated to an agent device 50a. This enables a transfer service from the telephone number N2 to the telephone number T.

Figure 17:
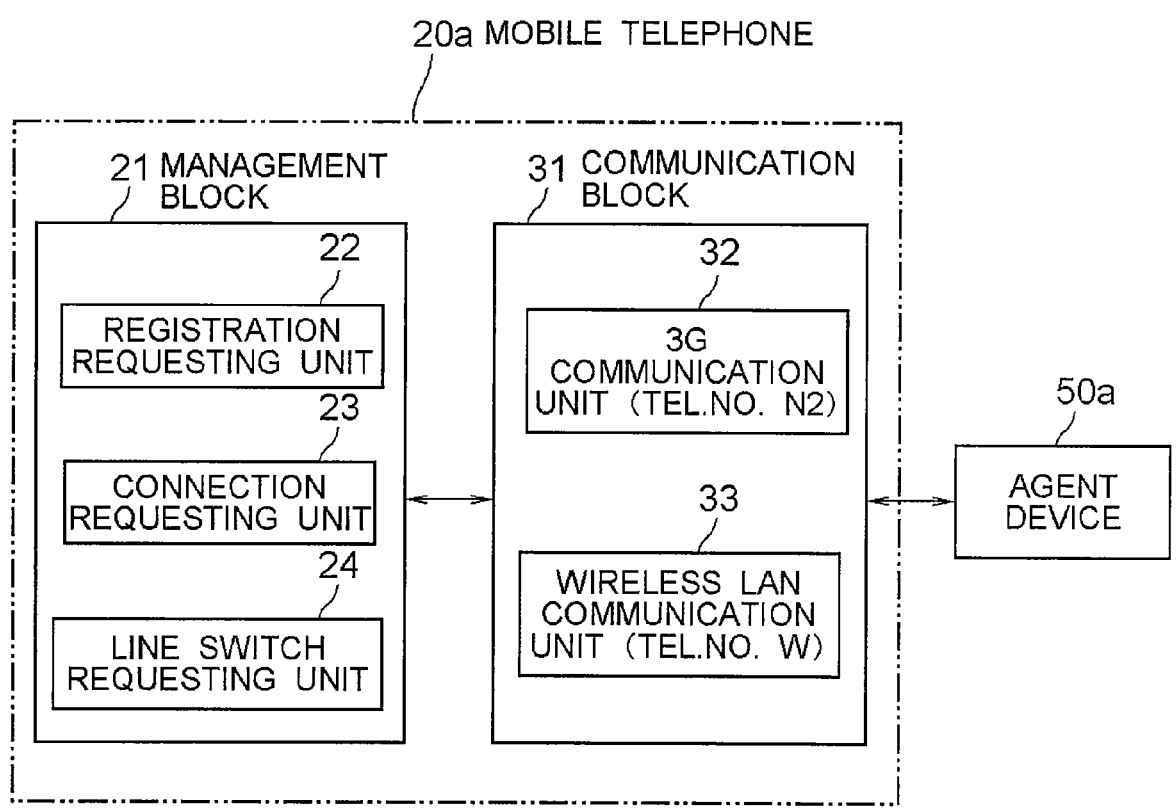
FIG. 17 is a function block diagram of a mobile telephone in FIG. 16.

FIG. 17 is a function block diagram of the primary terminal 20a. As shown in FIG. 17, the configuration of the primary terminal 20a is same as that of the primary terminal 20 shown in FIG. 2. However, to the 3 G communication unit 32, the telephone number N2 also used as the common telephone number is allocated.

Figure 18:
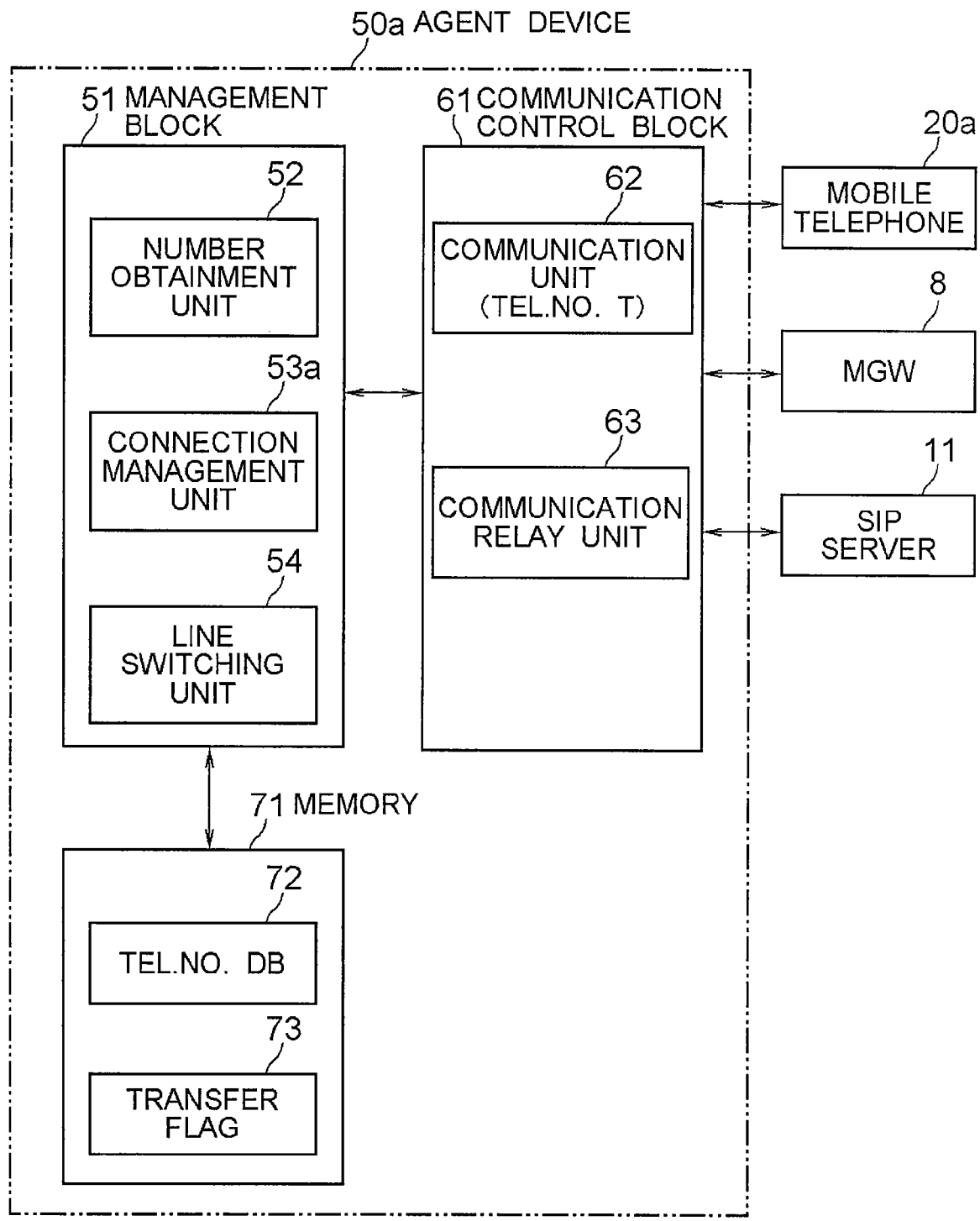
FIG. 18 is a function block diagram of the agent device in FIG. 16.

FIG. 18 is a function block diagram of the agent device 50a. As shown in FIG. 18, a number obtainment unit 52a has the function of setting the value of a transfer flag 73 when the telephone number of the primary terminal 20a is registered in the telephone number database 72, in addition to the functions described for the number obtainment unit 52, shown in FIG. 2.

Figure 3:
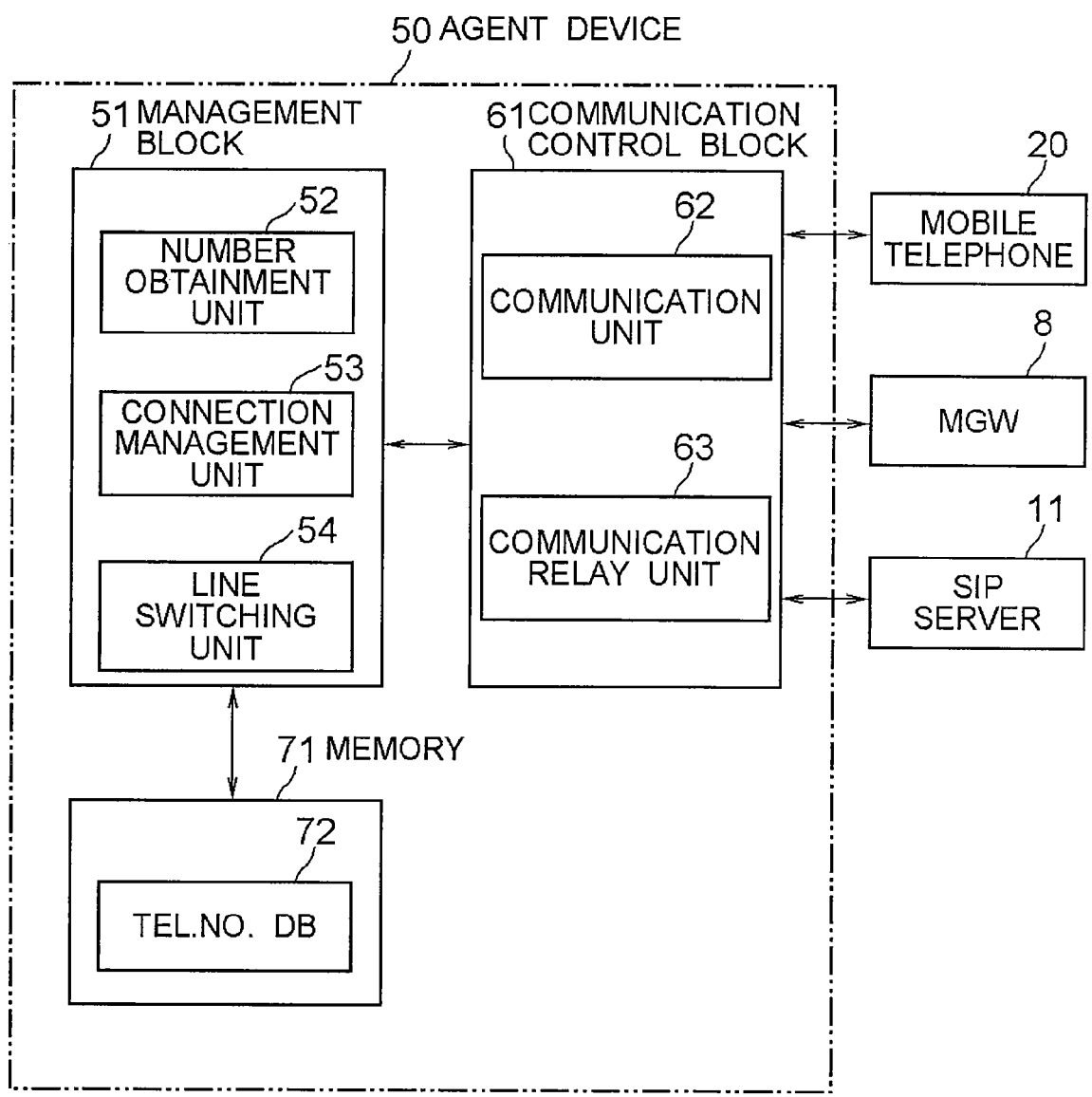
FIG. 3 is a function block diagram of an agent device in FIG. 1.

A connection management unit 53a has the same function as that of the connection management unit 53 shown in FIG. 3, but is different in that a calling telephone number is determined by referring to the transfer flag 73.=

The transfer flag 73 stored on the storage 71 is, for example, a logical variable. The transfer flag 73 is set such that when the telephone number of the primary terminal 20a registered in the telephone number database 72 is W, the value is set to ON (true), and when the number is N2, the value is set to OFF (false).

The remaining functioning of the constitutional elements of primary terminal 20a other than as described above are the same as those in primary terminal 20, shown in FIG. 2.

Figure 19:
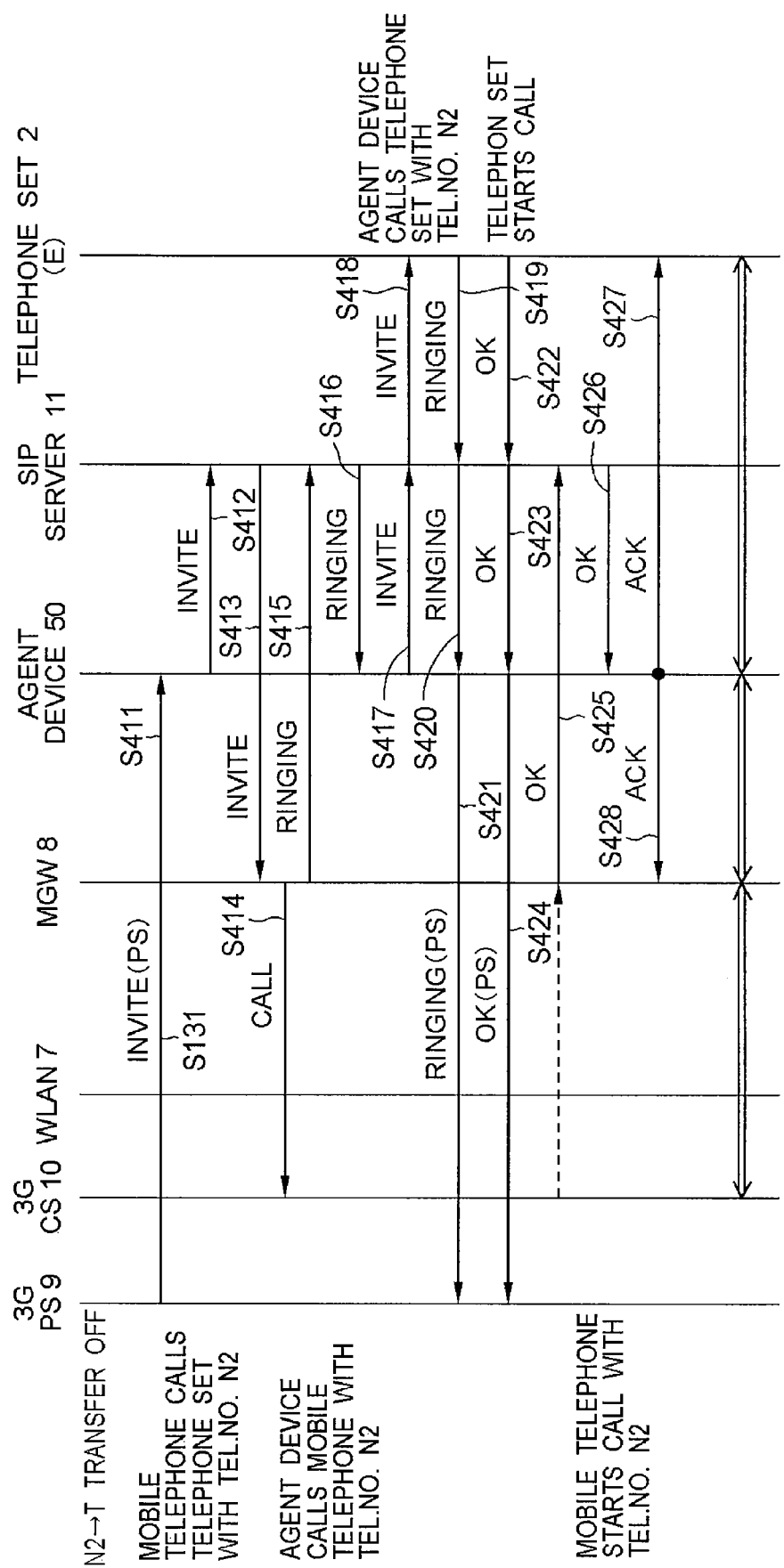
FIG. 19 is a sequence diagram showing an operation when originating a call of the telephone relay system in FIG. 16.

FIG. 19 is a sequence diagram showing an operation when the primary terminal 20a makes a connection request to the counterpart terminal 2 when the telephone number N2 is used. In this case, a transfer function of the agent device 50a is not activated.

The primary terminal 20a transmits a connection request (INVITE) to the agent device 50a over the packet switching network 9 (step S411).

Upon receiving the request, the agent device 50a controls the SIP server 11 to call the primary terminal 20a with the telephone number N2 of 3G (steps S412 to S416). This call is performed through the following procedure in accordance with SIP and the 3G mobile telephone protocol.

The agent device 50a transmits a connection request packet (INVITE) to the SIP server 11 (step S412). Upon receiving, the SIP server 11 transmits the connection request packet (INVITE) to the media gateway 8 (step S413).

The media gateway 8 transmits a call notification packet (CALL) with the telephone number N2 to the primary terminal 20a (step S414), and also transmits a calling packet (RINGING) indicating the calling to the SIP server 11 (step S415). The SIP server 11 transfers the calling packet (RINGING) to the agent device 50 (step S416).

Next, the agent device 50a controls the SIP server 11 to call the telephone number E of the counterpart terminal 2 (steps S417 to S427). In this case, the telephone number designated as the originator by the agent device 50a is N2 used as the common telephone number, which is one of the two telephone numbers assigned to the primary terminal 20a. This call is made through the following procedure in accordance with SIP.

The agent device 50a transmits a connection request packet (INVITE) to the SIP server 11 (step S417). Upon receiving the packet, the SIP server 11 transmits a connection request (INVITE) with the telephone number N2 to the counterpart terminal 2 (step S418).

When the SIP server 11 calls the counterpart terminal 2, a calling packet (RINGING) of the counterpart terminal 2 is transmitted from the counterpart terminal 2 to the SIP server 11 (step S419) which is transferred from the SIP server 11 to the agent device 50a (step S420), and further transferred to the primary terminal 20a over the packet switching network 9 (step S421).

When the counterpart terminal 2 responds to the call origination packet (INVITE), a response packet (OK) accepting to start the call is transmitted from the counterpart terminal 2 to the SIP server 11 (step S422). The response packet from the counterpart terminal 2 is transferred to the primary terminal 20a via the SIP server 11 and the agent device 50 (steps S423, S424).

Following the response from the counterpart terminal 2, when the primary terminal 20*a* responds, the media gateway 8 transmits a response packet (OK) to the SIP server 11 (step S425). When the SIP server 11 receives the response packet (OK) from the media gateway 8, it transfers the response packet (OK) to the agent device 50*a* (step S426).

When the agent device 50 receives the response packet (OK) from the SIP server 11, it transmits an acknowledge message (ACK) to the media gateway 8 and the counterpart terminal 2 (steps S428, S427). Thereby, a call session is established between the agent device 50*a* and the counterpart terminal 2.

Figure 20:
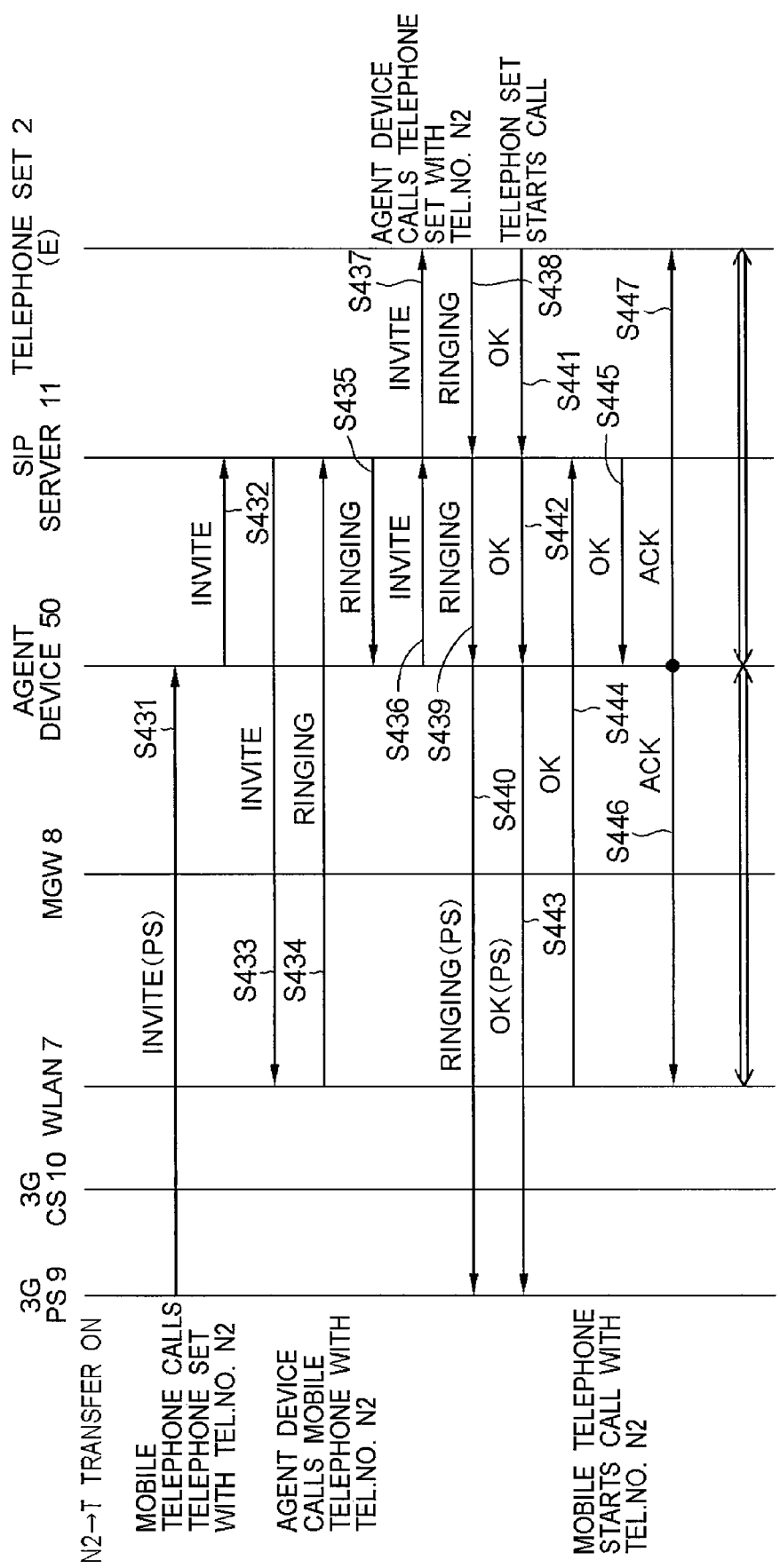
FIG. 20 is a sequence diagram showing an operation when originating a call of the telephone relay system in FIG. 16.

FIG. 20 is a sequence diagram for explaining a process of transferring the connecting destination of the counterpart terminal 2 to the primary terminal 20 of the telephone number W when the primary terminal 20*a* makes a connection request to the counterpart terminal 2 with the telephone number N2. In this case, the transfer function of the agent device 50*a* is activated.

The primary terminal 20*a* transmits a connection request packet (INVITE) for connecting to the counterpart terminal 2 with the telephone number N2 to the agent device 50 over the packet switching network 9 (step S431).

Upon receiving the request, the agent device 50*a* controls the SIP server 11 so as to call the primary terminal 20*a* with the telephone number N2 over the wireless LAN 7 (steps S432 to S435). This call is performed through the following procedure in accordance with SIP.

Based on the connection request packet (INVITE(PS)) with the telephone number N2 from the primary terminal 20*a*, the agent device 50*a* transmits a connection request packet (INVITE) to the SIP server 11 (step S432). In the example shown in FIG. 20, a telephone number T used for transfer is sent to the agent device 50*a*, and the agent device 50*a* is set to perform a transfer service to transfer to the telephone number W as the telephone number T of the transfer destination. Therefore, when receiving a connection request with the telephone number N2 from the primary terminal 20*a*, the agent device 50*a* transfers the connection destination of the telephone number N2 to the telephone number W, so it transmits a connection request packet (INVITE) of the telephone number W to the SIP server 11 (step S432). When the SIP server 11 receives the connection request packet (INVITE) from the agent device 50, it transmits a connection request packet (INVITE) to the wireless LAN 7 performing a line connection with the telephone number W (step S433).

When the wireless LAN 7 calls the primary terminal 20*a*, it transmits a calling packet (RINGING) indicating the calling to the SIP server 11 (step S434). When the SIP server 11 receives the calling packet (RINGING) from the wireless LAN 7, it transfers the packet to the agent device 50*a* (step S435).

Next, the agent device 50*a* controls the SIP server 11 to call the counterpart terminal 2 with the telephone number N2 (steps S436 to S447). At this point, the telephone number that the agent device 50*a* designates as the originator is N2 used as the common telephone number, which is one of the two telephone numbers assigned to the primary terminal 20*a*. This call is performed through the following procedure in accordance with SIP.

More specifically, when the agent device 50*a* receives a calling packet (RINGING) from the SIP server 11 (step S435), it transmits a call origination packet (INVITE) to the SIP server 11 (step S436). When the SIP server 11 receives the origination packet (INVITE) from the agent device 50*a*, it calls the counterpart terminal 2 with the telephone number N2 (step S437).

When the SIP server 11 calls the counterpart terminal 2, a calling packet (RINGING) is transmitted from the counterpart terminal 2 to the SIP server 11 (step S438). When the agent device 50 receives a calling packet (RINGING) from the SIP server 11 (step S439), it transmits the calling packet (RINGING(PS)) to the primary terminal 20*a* over the packet switching network 9 (step S440).

When the counterpart terminal 2 responds to the call origination packet (INVITE), a response packet (OK) accepting to start the call is transmitted from the counterpart terminal 2 to the SIP server 11 (step S441). The response packet (OK) from the counterpart terminal 2 is transferred to the primary terminal 20*a* via the SIP server 11 and the agent device 50 (steps S442, S443).

Following the response of the counterpart terminal 2, when the primary terminal 20*a* responds, the wireless LAN 7 transmits the response packet (OK) to the SIP server 11 (step S444). When the SIP server 11 receives the response packet (OK) from the wireless LAN 7, it transfers the response packet (OK) to the agent device 50*a* (step S445).

When the agent device 50 receives the response packet (OK) from the SIP server 11, it transmits an acknowledge message (ACK) to the wireless LAN 7 and the counterpart terminal 2 (steps S446, S447). Thereby, a call session is established between the agent device 50*a* and the counterpart terminal 2.

Figure 21:
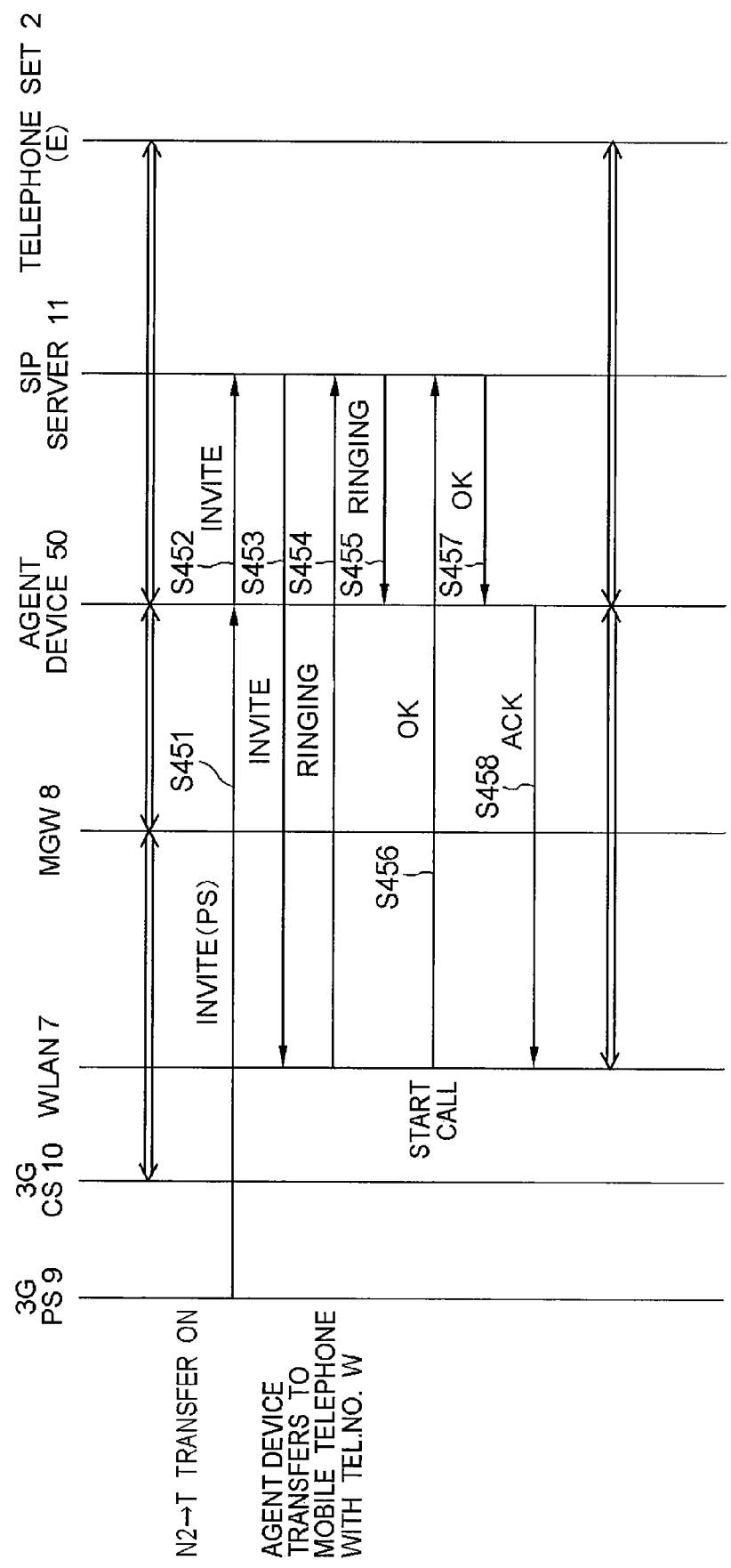
FIG. 21 is a sequence diagram showing a line switching operation of the telephone relay system in FIG. 16.

FIG. 21 is a sequence diagram explaining a process of transferring a line connection over the 3G mobile telephone network 5 to a line connection over the wireless LAN 7, during a call between the primary terminal 20*a* and the counterpart terminal 2 using the 3G mobile telephone network 5. In this case, the transferring function of the agent device 50*a* is activated.

The primary terminal 20*a* transmits a transfer request packet (INVITE) for performing a transfer instruction to line-connect to the primary terminal 20 with the telephone number W to the agent device 50 over the packet switching network 9 (step S451). When the agent device 50*a* receives the transfer request packet (INVITE) from the primary terminal 20*a*, it transmits a calling packet (INVITE) to call the primary terminal 20*a* with the telephone number W to the SIP server 11 (step S452).

When the SIP server 11 receives a call packet (INVITE) from the agent device 50, it transmits the call packet (INVITE) to the wireless LAN 7 (step S453). When the wireless LAN 7 receives the call packet (INVITE), it calls the primary terminal 20*a* with the telephone number W, and transmits a calling packet (RINGING) indicating the calling with the telephone number W to the SIP server 11 (step S454). The calling packet (RINGING) from the wireless LAN 7 is transferred from the SIP server 11 to the agent device 50 (step S455).

When the primary terminal 20*a* responds to the calling by the wireless LAN 7, the wireless LAN 7 transmits a response packet (OK) to the SIP server 11 (step S456). The SIP server 11 transfers the response packet (OK) to the agent device 50 (step S457). When the agent device 50 receives the response packet (OK) from the SIP server 11, it transmits an acknowledge packet (ACK) to the wireless LAN 7 (step S458). Thereby, a line connection between the primary terminal 20*a* and the counterpart terminal 2 with the telephone number N2 over the 3G mobile telephone network 5 is transferred to a line connection with the telephone number W over the wireless LAN 7 (double arrow line).

Figure 22:
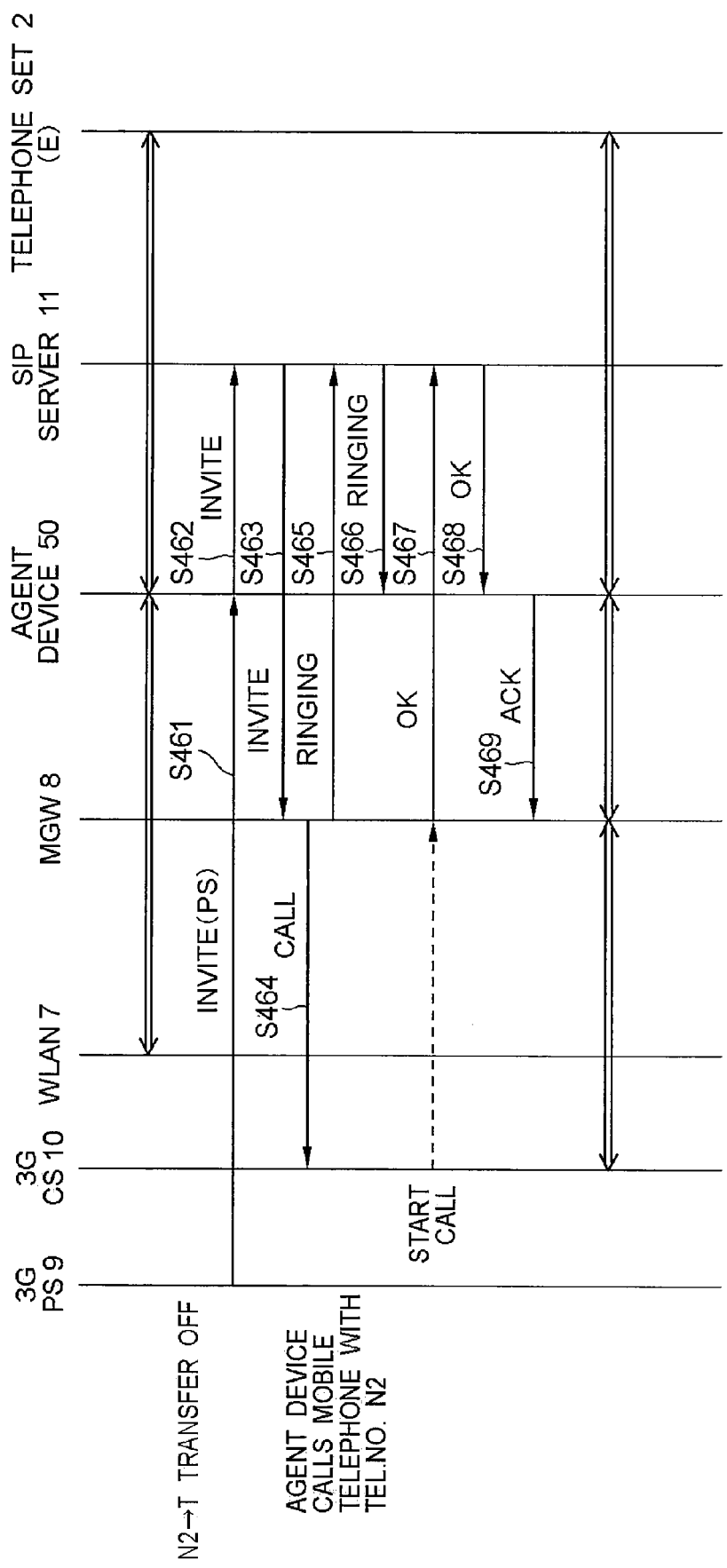
FIG. 22 is a sequence diagram showing a line switching operation of the telephone relay system in FIG. 16.

FIG. 22 is a sequence diagram showing the process of switching from the wireless LAN 7 network to the 3G mobile telephone network 5 during a call between the primary terminal 20*a* and the counterpart terminal 2. In this case, the transfer function of the agent device 50*a* is stopped.

The primary terminal 20*a* transmits a line switch request (INVITE) to request for line switching to the agent device 50*a* over the packet switching network 9 (step S461). The agent device 50 transmits a line connection request (INVITE) of the telephone number N2, instead of the telephone number W, to the SIP server 11 (step S462). When the SIP server 11 receives the line connection request (INVITE) with the telephone number N2, it transmits a call origination request packet (CALL) to the media gateway 8 (step S463).

When the media gateway 8 receives the origination request packet (INVITE) from the SIP server 11, it calls the primary terminal 20*a* with the telephone number N2 (step S464), and also transmits a calling packet (RINGING) for the primary terminal 20*a* to the SIP server 11 (step S465). The calling packet (RINGING) from the media gateway 8 is transferred to the agent device 50*a* via the SIP server 11 (step S466).

When the primary terminal 20*a* responds to the calling from the media gateway 8, the media gateway 8 transmits a response packet (OK) to the SIP server 11 (step S467). The response packet (OK) from the media gateway 8 is transferred to the agent device 50*a* (step S467).

When the agent device 50*a* receives the response packet (OK) from the media gateway 8, it transmits an acknowledge packet (ACK) to the media gateway 8 (step S469). Thereby, a call using the wireless LAN 7 network (double arrow line) can be switched to the 3G mobile telephone network 5 during a call between the primary terminal 20*a* and the counterpart terminal 2.

Figure 23:
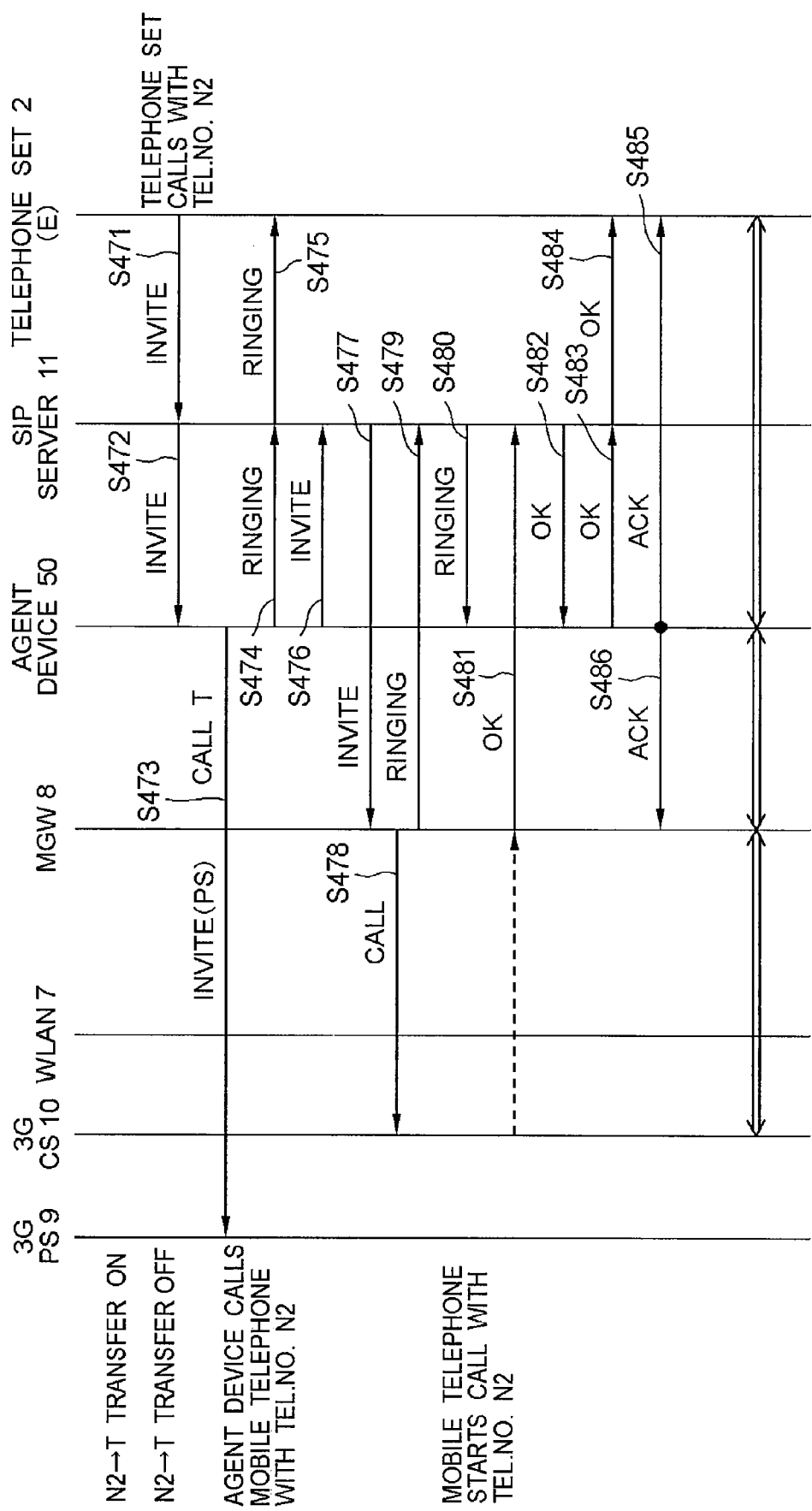
FIG. 23 is a sequence diagram showing an operation when a call arrives of the telephone relay system in FIG. 16.

FIG. 23 is a sequence diagram showing the operation when a call is made from the counterpart terminal 2 if the telephone number N2 of the primary terminal 20*a* on the 3G mobile telephone network is registered in the agent device 50*a*. In this case, the transfer function of the agent device 50 is stopped.

The counterpart terminal 2 transmits a line connection requesting packet (INVITE) to the SIP server 11 in accordance with the procedures of SIP designating the telephone number N2 recognized as the telephone number of the primary terminal 20*a* (step S471). The line connection requesting packet (INVITE) is transferred to the agent device 50*a* by the SIP server 11 (step S472). When the agent device 50 receives the line connection requesting packet (INVITE) from the SIP server 11, it transmits a line connection requesting packet (INVITE(PS)) to the primary terminal 20*a* over the telephone network of the registered telephone number T (in this example, telephone number T=telephone number N2), that is, the packet switching network 9 in this example (step S473).

The agent device 50*a* transmits a calling packet (RINGING) indicating the primary terminal 20*a* is called and a call origination packet (INVITE) for making a call to the primary terminal 20*a* to the SIP server 11 (steps S474, S476).

When the SIP server 11 receives the calling packet (RINGING) from the agent device 50, it transmits a calling packet (RINGING) notifying that the primary terminal 20*a* is called to the counterpart terminal 2 (step S475), and transmits a call origination packet (INVITE) with the telephone number N2 to the media gateway 8 (step S477).

The media gateway 8 transmits a call packet (CALL) with the telephone number N2 to the 3G mobile telephone network 5 (step S478), and transmits a calling packet (RINGING) of the primary terminal 20*a* to the SIP server 11 (step S479). The calling packet (RINGING) is transmitted from the SIP server 11 to the agent device 50 (step S480).

When the primary terminal 20*a* responds in this sequence, the media gateway 8 transmits a response packet (OK) notifying that the primary terminal 20*a* has responded to the SIP server 11 (step S481). The response packet (OK) is transmitted from the SIP server 11 to the agent device 50*a* (step S482).

When the agent device 50*a* receives a response packet (OK) from the SIP server 11, it controls the SIP server 11 to transmit the response packet (OK) to the counterpart terminal 2 (steps S483, S484). Further, the agent device 50*a* transmits an acknowledge packet (ACK) to the media gateway 8 and the counterpart terminal 2 (steps S485, S486).

Thereby, a call session is established between the counterpart terminal 2 and the primary terminal 20*a*.

Figure 24:
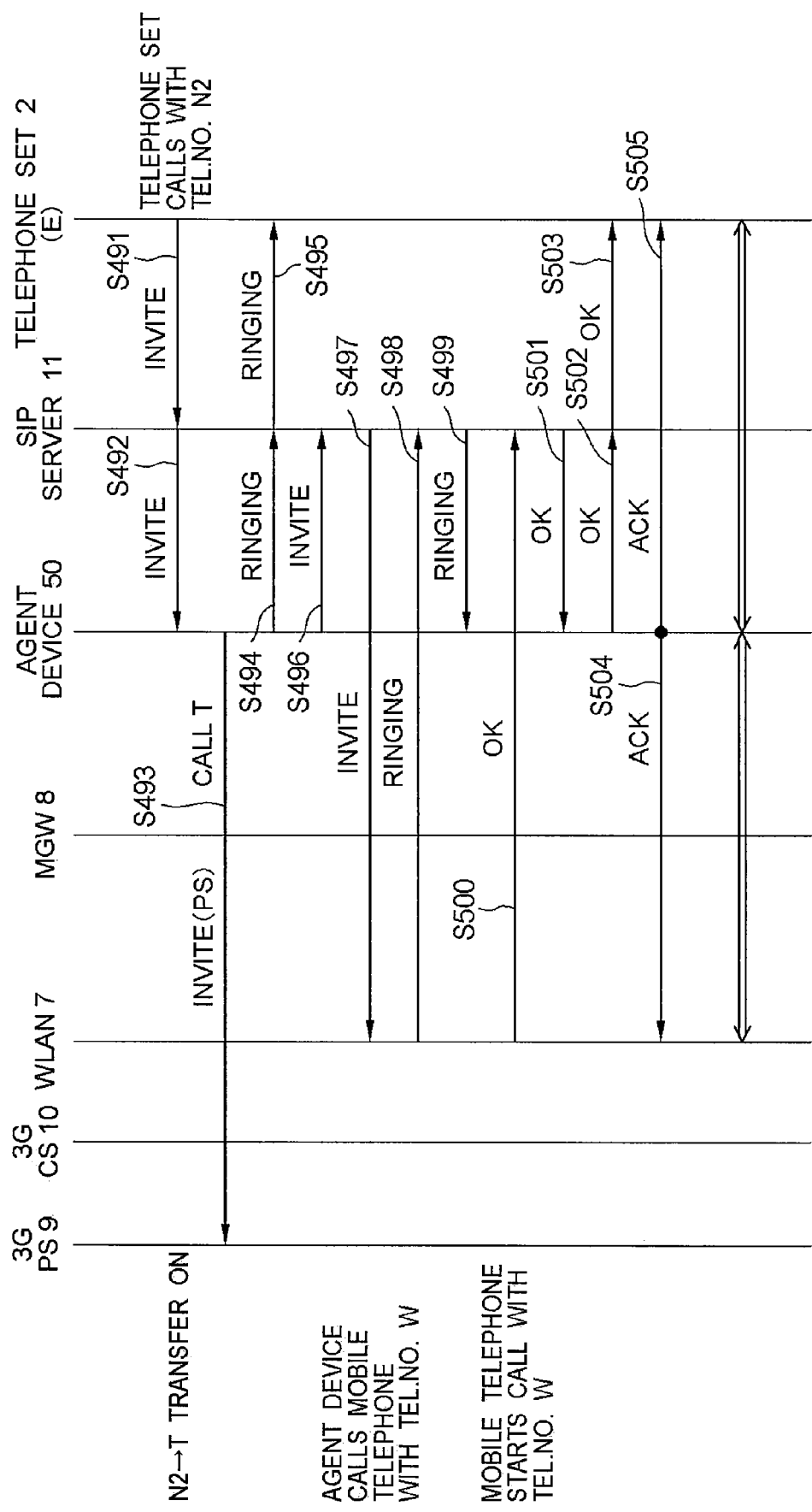
FIG. 24 is a sequence diagram showing an operation when a call arrives of the telephone relay system in FIG. 16.

FIG. 24 depicts a process of transferring a call made by the counterpart terminal 2 to the network of the telephone number W of the primary terminal 20*a* performed by the transfer function of the agent device 50*a*, when the counterpart terminal 2 makes a call with the telephone number N2.

The counterpart terminal 2 designates the telephone number N2 recognized as the telephone number of the primary terminal 20*a* and transmits a line connection requesting packet (INVITE) to the SIP server 11 in accordance with the procedure of SIP (step S491). The line connection requesting packet (INVITE) is transmitted to the agent device 50*a* (step S492).

The agent device 50*a* is so set that a call with the telephone number N2 from the counterpart terminal 2 is transferred to the telephone number T. In this example, it is assumed that the agent device 50*a* is set so that the transfer destination as the telephone number T is the network of the telephone number W.

When the agent device 50*a* receives a line connection requesting packet (INVITE) from the SIP server 11, it transmits the line connection requesting packet (INVITE(PS)) to the primary terminal 20*a* over the telephone network of the registered telephone number T (in this example, telephone number T=telephone number W), that is, the packet switching network 9 in this example (step S493).

The agent device 50*a* transmits a calling packet (RINGING) indicating the primary terminal 20*a* is called and a call origination packet (INVITE) for making a call to the primary terminal 20*a* to the SIP server 11 (steps S494, S496).

When the SIP server 11 receives the calling packet (RINGING) from the agent device 50*a*, it transmits a calling packet (RINGING) to notify that the primary terminal 20*a* is called to the counterpart terminal 2 (step S495), and to transmit a call origination packet (INVITE) with the telephone number W to the wireless LAN 7 (step S497).

When the wireless LAN 7 receives a call packet (CALL) with the telephone number W, it transmits a calling packet (RINGING) for the primary terminal 20*a* to the SIP server 11 (step S498). The calling packet (RINGING) is transmitted from the SIP server 11 to the agent device 50 (step S499).

When the primary terminal 20*a* responds in this sequence, the wireless LAN 7 transmits a response packet (OK) to notify that the primary terminal 20*a* has responded to the SIP server (step S500). The response packet (OK) is transmitted from the SIP server 11 to the agent device 50 (step S501).

When the agent device 50*a* receives the response packet (OK) from the SIP server 11, it controls the SIP server 11 so as to transmit the response packet (OK) to the counterpart terminal 2 (steps S502, S503). Further, the agent device 50*a* transmits an acknowledge packet (ACK) to the wireless LAN 7 and the counterpart terminal 2 (steps S504, S505).

Thereby, a call session is established between the counterpart terminal 2 and the primary terminal 20*a*.

(Operation of Agent Device 50a)

Figure 25:
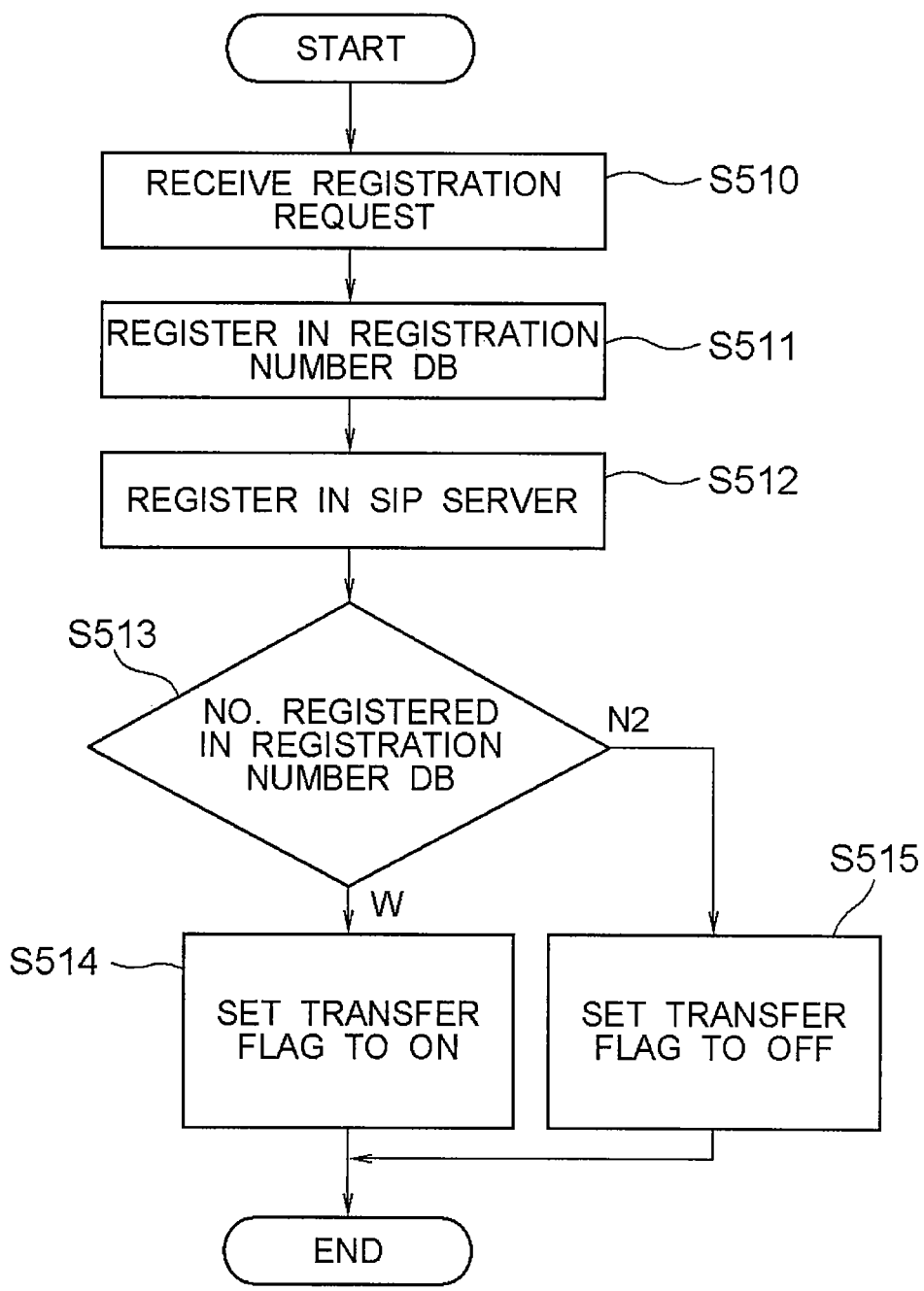
FIG. 25 is a sequence diagram showing a telephone number registering operation of the agent device in FIG. 16.

FIG. 25 is a flowchart showing an operation by the agent device 50a to register a telephone number of the primary terminal 20a.

The communication unit 62 receives a registration request transmitted from the primary terminal 20a (step S510). The number obtainment unit 52 obtains a telephone number, included in the registration request, to be registered as a telephone number to be used currently by the primary terminal 20a, and stores it in the telephone number database 72 associating it with the common telephone number N2 of the primary terminal 20a which transmitted the registration request (step S511).

The number obtainment unit 52 transmits the telephone number T of the agent device 50a to the SIP server 11 via the communication unit 62, and registers it in the SIP server 11 (step S512). The registration is performed in accordance with SIP.

If the telephone number registered in the telephone number DB 72 is W, the connection management unit 53a sets the value of the transfer flag 73 to ON (true) (step S513, step S514), and if the telephone number registered in the telephone number DB 72 is N2, it sets the value of the transfer flag 73 to OFF (false) (step S513, step S515), respectively.

Figure 26:
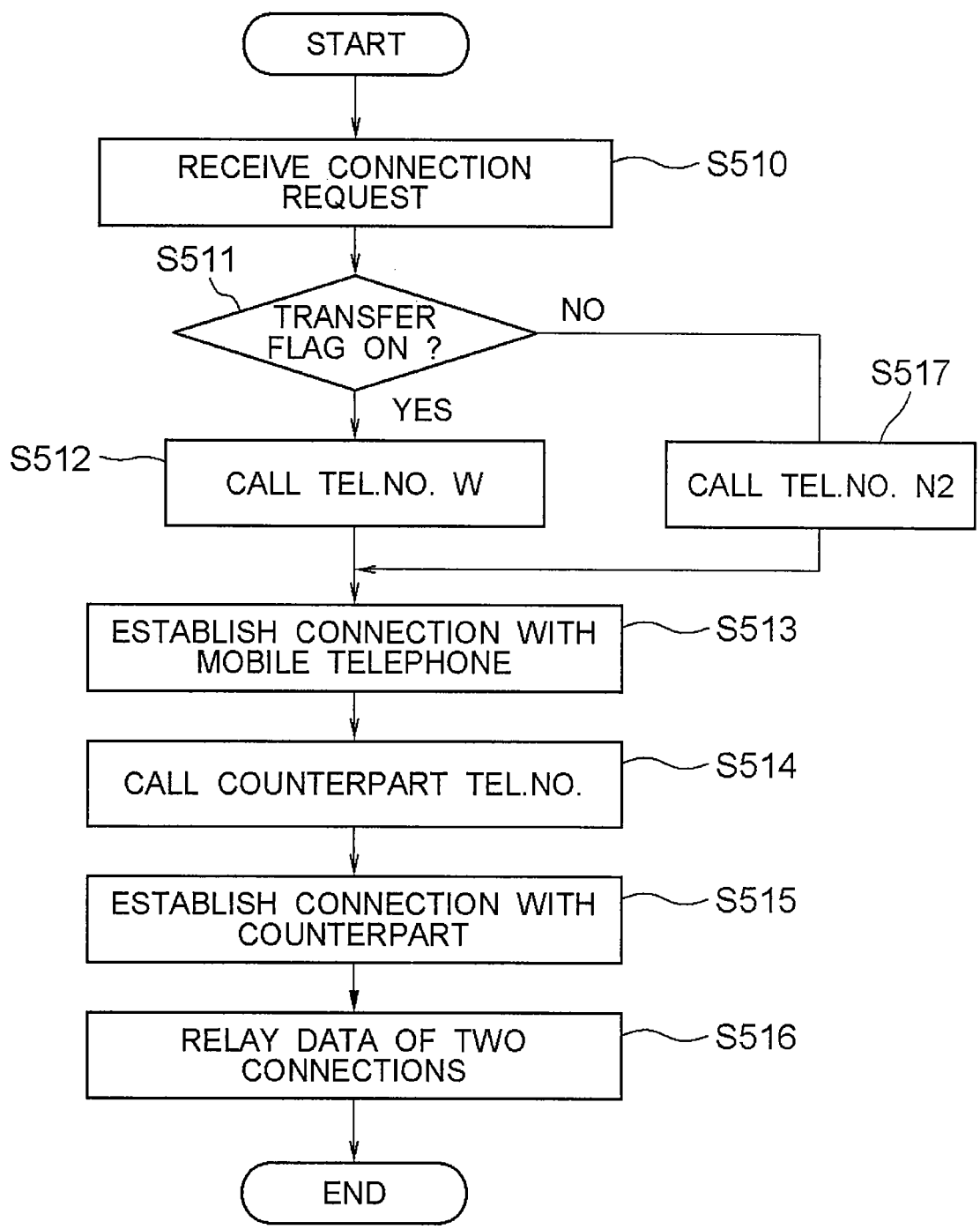
FIG. 26 is a sequence diagram showing an operation when originating a call of the agent device in FIG. 16.

FIG. 26 is a flowchart showing an operation when the agent device 50a receives a connection request from the primary terminal 20a.

When the communication unit 62 receives a connection request from the primary terminal 20a (step S510), the connection management unit 53a refers to the transfer flag 73 to determine whether the value is ON (true) (step S511). If the transfer flag 73 is ON, the connection management unit 53a calls the telephone number W (step S512), and if the transfer flag 73 is OFF (false), it calls the telephone number N2 (step S517) respectively, to establish a connection with the primary terminal 20a (step S513).

The connection management unit 53a also calls the telephone number E of the counterpart terminal 2 (step S514) and establishes a connection with the counterpart terminal 2 as well (step S515). At this point, the telephone number of the originator sent to the counterpart terminal 2 is the telephone number N2.

Through the processing described above, two connections are established between the primary terminal 20a (telephone number N2) and the agent device 50a, and between the agent device 50a and the counterpart terminal 2. The communication relay unit 63 transmits data received from one of the two connections to the other to relay communications between the primary terminal 20a and the counterpart terminal 2 (step S516).

Figure 27:
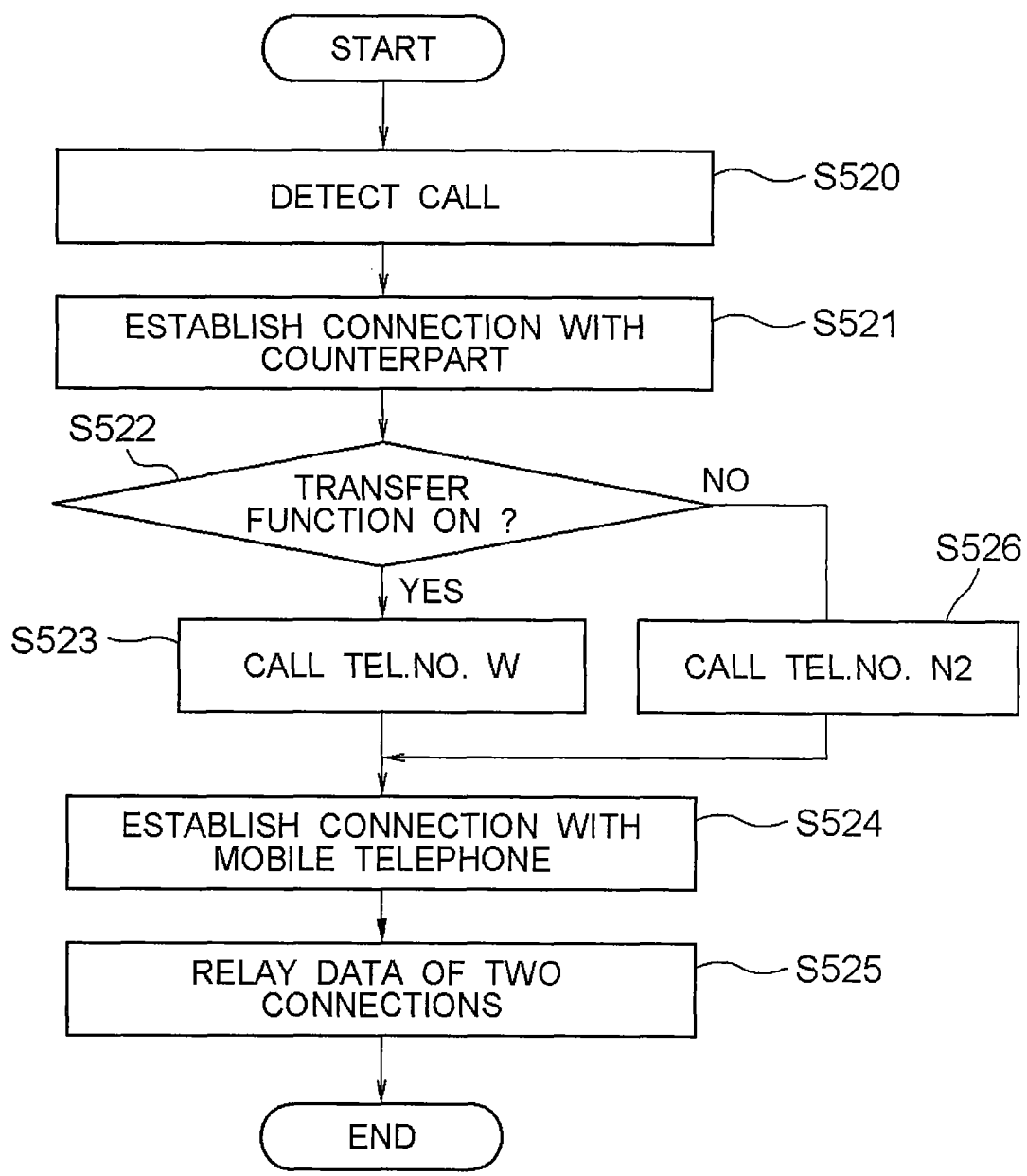
FIG. 27 is a sequence diagram showing an operation when a call arrives of the agent device in FIG. 16.

FIG. 27 is a flowchart showing an operation when the agent device 50a detects an incoming call to the primary terminal 20a.

The communication unit 62 detects an incoming call to the telephone number N2 of the primary terminal 20a from the counterpart terminal 2 (step S520). At this point, the counterpart terminal 2 designates the telephone number N2 as the telephone number of the primary terminal 20a, irrespective of the number currently registered in the telephone number database 72. The communication management unit 53 establishes a connection with the counterpart terminal 2 corresponding to the incoming call (step S521).

The connection management unit 53a refers to the transfer flag 73 and determines whether the value is ON (true) (step S522). If the transfer flag 73 is ON, the connection management unit 53a calls the telephone number W (step S523), and if the transfer flag 73 is OFF (false), it calls the telephone number N2 (step S526) to establish a connection with the primary terminal 20a (step S524).

The communication relay unit 63 relays communications between the primary terminal 20a and the counterpart terminal 2 in the same manner as S516 in FIG. 26.

Figure 28:
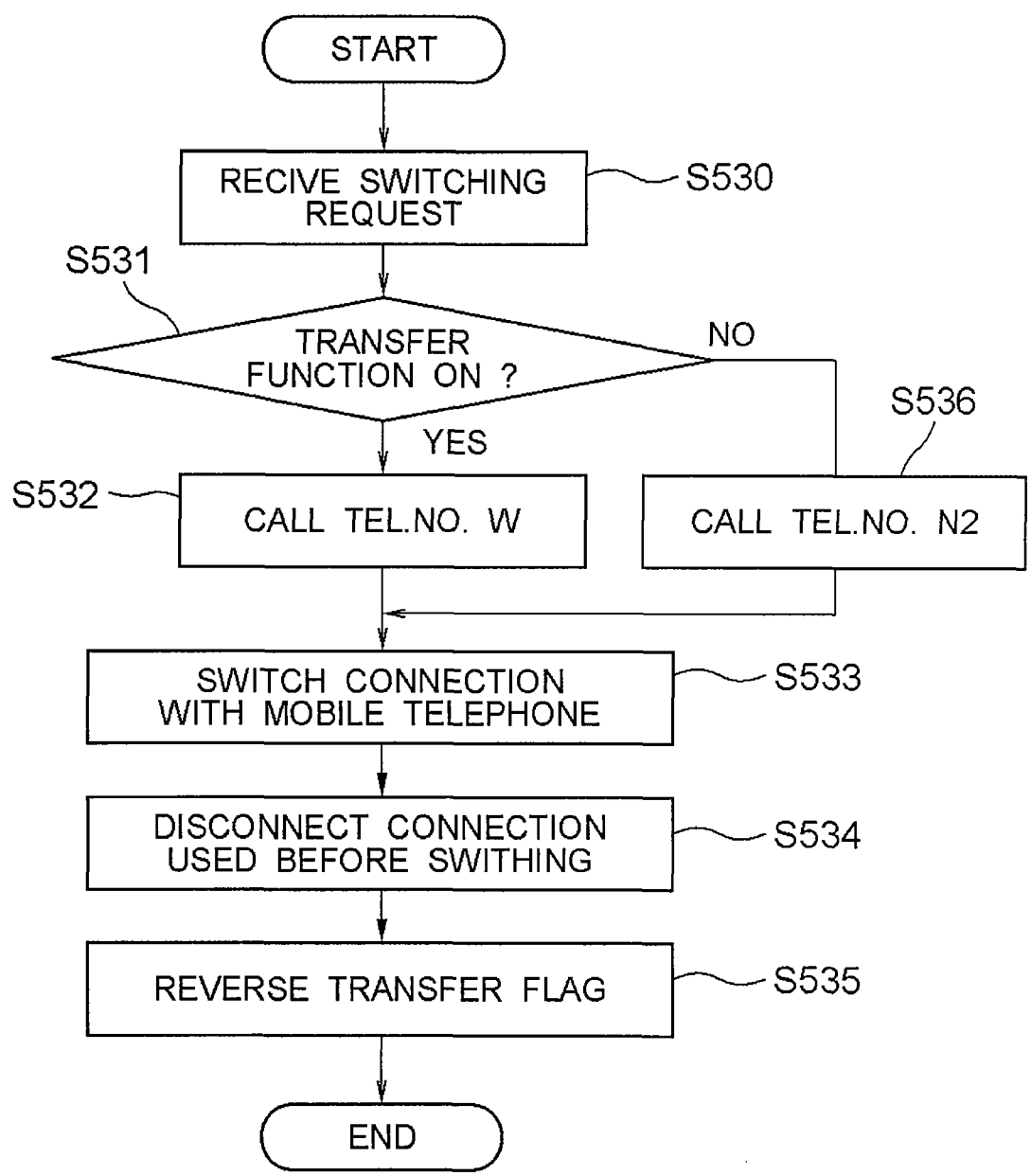
FIG. 28 is a sequence diagram showing a line switching operation of the agent device in FIG. 16.

FIG. 28 is a flowchart showing an operation when the agent device 50a receives a line switch request from the primary terminal 20a.

When the communication unit 62 receives a line switch request from the primary terminal 20a (step S530), the connection management unit 53a refers to the transfer flag 73 and determines whether the value is ON (true) (step S531). If the transfer flag 73 is ON, the connection management unit 53a calls the telephone number W (step S532), and if the transfer flag 73 is OFF (false), it calls the telephone number N2 (step S536) to switch the connection with the primary terminal 20a.

When the switch becomes successful, the connection management unit 53a disconnects the connection between the primary terminal 20a and the agent device 50a used before the switching (step S534). The number obtainment unit 52 reverses the value of the transfer flag 73 and stores it on the memory 71 (step S535).

In the above-described scenario, the telephone relay system 1a, the case where an incoming call to the common telephone number N2 is transferred to the telephone number of the primary terminal 20a when the transfer function is ON has been described. However, it is possible to transfer to a telephone set other than the primary terminal 20a in the manner shown in FIG. 29.

Figure 29:
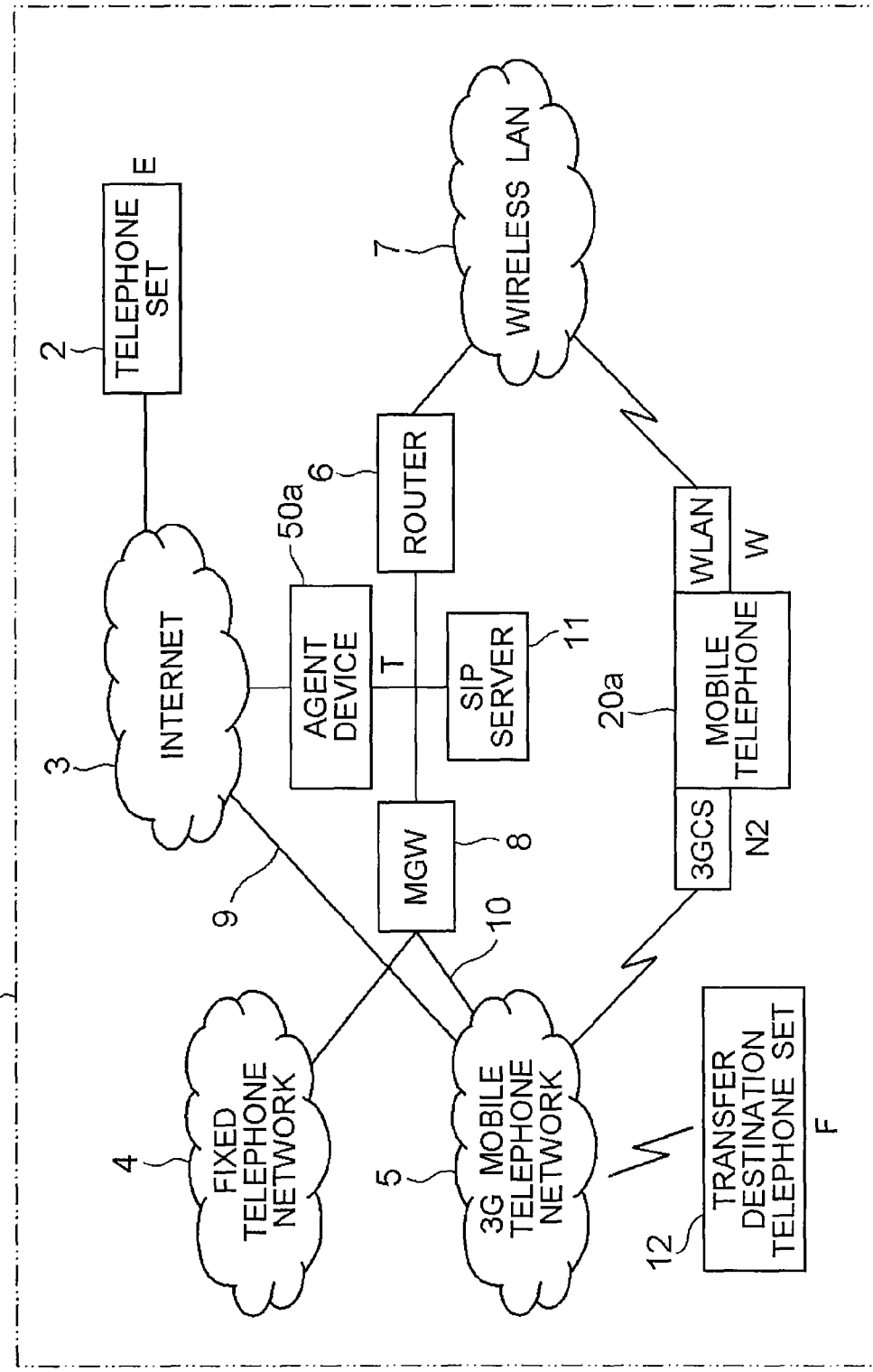
FIG. 29 is an overall view of a telephone relay system in which a transfer destination is a primary terminal other than a mobile telephone.
Figure 30:
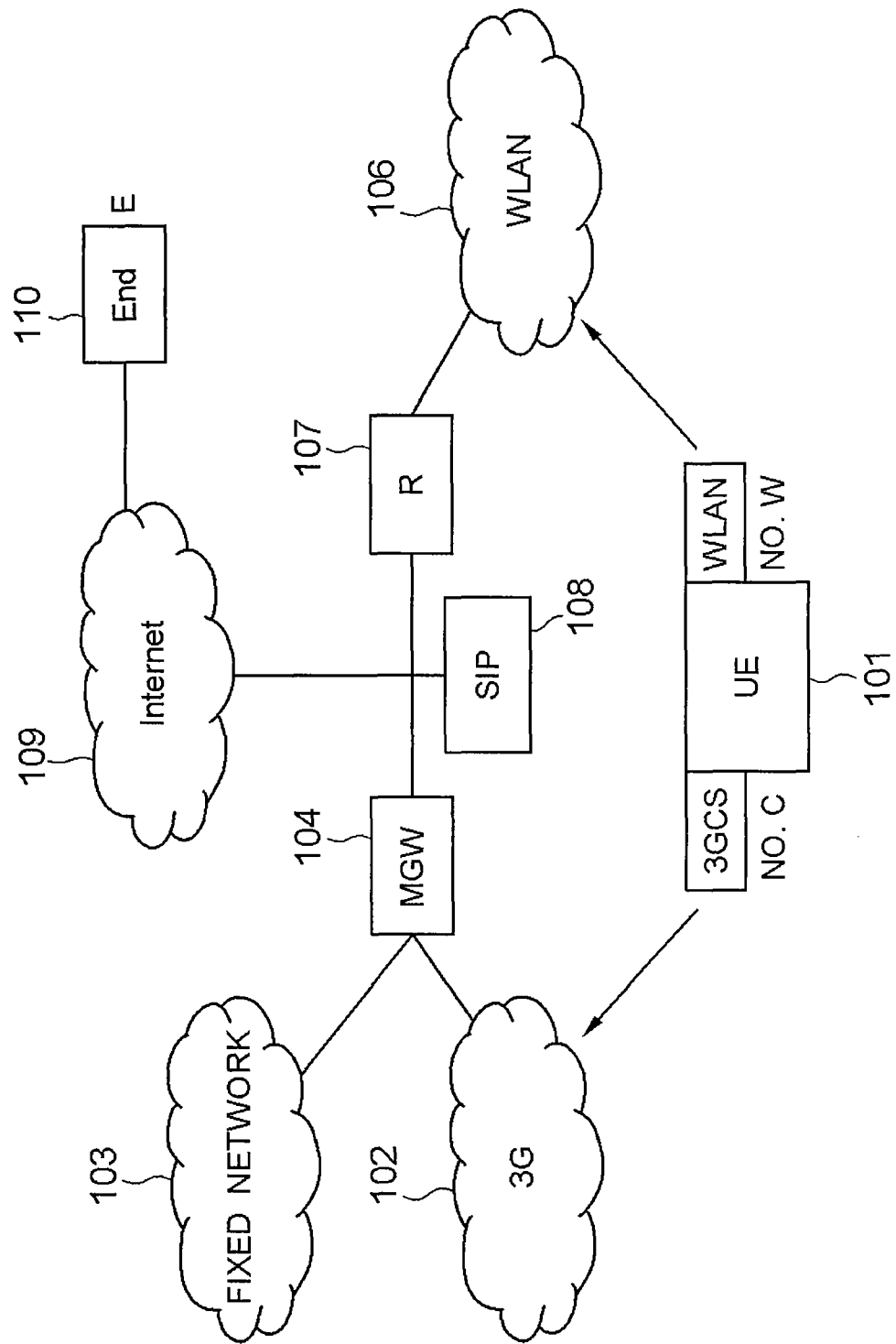
FIG. 30 is an overall view showing the configuration of a conventional telephone relay system.

A transfer destination telephone set 12 is a telephone device to which a telephone number F is allocated. Although an example of a connection to the 3G mobile telephone network 5 is shown in FIG. 29, any connecting network is acceptable.

By registering the telephone number F in the telephone number database 72 shown in FIG. 4, instead of the telephone number W, associating it with the telephone number N2, the agent device 50a can perform transfer to the telephone number F through the procedures shown in FIGS. 21 to 24.

In the telephone relay system 1a, the telephone number N2, which is one of the two telephone numbers N2 and W allocated to the primary terminal 20a corresponding to the two communication networks of 3G mobile telephone network 5 and the wireless LAN 7, is used as the common telephone number.

Therefore, there is no need to allocate an additional telephone number exclusive for a common telephone number to the primary terminal 20a.

Further, if the current telephone number is the telephone number W which is different from the telephone number N2 selected as the common telephone number, the connection management unit 53a will call the telephone number N2. Therefore, it is possible to transfer an incoming call to the agent device 50a to the common telephone number N2.

What is claimed is:

1. A telephone switching system, comprising:
a memory storing information associating first, second and third telephone numbers with a single mobile terminal,
the first telephone number corresponding to a first telephone network to which the mobile terminal can be connected,
the second telephone number corresponding to a second telephone network to which the mobile terminal can be connected, and
the third telephone number being a common telephone number for the mobile terminal, and the memory also storing information indicating which of the telephone networks the mobile terminal is presently connected to;

an agent computer which, upon receipt of a signal sent via the first telephone network indicating that the mobile terminal is attempting to place a phone call using the second telephone number to a telephone number associated with a third party terminal:

looks up the common telephone number in the memory;

causes a request to accept a call from the mobile terminal to be sent to the third party terminal using the common telephone number to identify the mobile terminal;

causes a request to accept a call to be sent to the mobile terminal using the second telephone number via the second telephone network;

causes a connection to be made between the agent computer and the mobile terminal; and if the third party terminal accepts the request, causes a connection to be made between the agent computer and the third party terminal.

2. The telephone switching system of claim 1, wherein the first and second telephone numbers are a PSTN telephone number and an IP telephone number, respectively.

3. The telephone switching system of claim 1, wherein the agent computer periodically receives new information identifying the telephone network to which the mobile terminal is connected while the mobile terminal is switched on and connected to one of the first or second telephone networks, the agent computer updating the memory to reflect which of the first and second telephone networks the mobile terminal is presently connected to.

4. The telephone switching system of claim 1, further comprising a SIP server, the agent computer setting up the two connections via the SIP server.

5. The telephone switching system of claim 4, wherein the agent computer sends a request to the SIP server to establish the connection between the agent computer and the mobile terminal, and the SIP server responds to that request by sending the request to accept the call sent to the mobile terminal using the second telephone number.

6. The telephone switching system of claim 1, wherein the first telephone network is a mobile telephone network and the second telephone network is a wireless LAN network and wherein a media gateway and a router are provided for interfacing with the mobile telephone network and wireless LAN network, respectively.

7. The telephone switching system of claim 1, wherein the agent computer, upon receiving a call request from a fourth party identifying the third telephone number as the called number:

determines which telephone network the mobile terminal is presently connected to as a function of the information stored in the memory; and sends a connection request to the mobile terminal using the telephone number corresponding to the telephone network to which the mobile terminal is presently connected as indicated by the information stored in the memory.

8. A telephone switching method, comprising:

storing information in a memory associating first, second and third telephone numbers with a single mobile terminal, the first telephone number corresponding to a first telephone network to which the mobile terminal can be connected, the second telephone number corresponding to a second telephone network to which the mobile terminal can be connected, and the third telephone number being a common telephone number for the mobile terminal;

storing information in the memory indicating which of the telephone networks the mobile terminal is presently connected to; and upon receipt by an agent computer of a signal sent via the first telephone network indicating that the mobile terminal is attempting to place a phone call using the second telephone number to a telephone number associated with a third party terminal, the agent computer:

looking up the common telephone number in the memory;

causing a request to accept a call from the mobile terminal to be sent to the third party terminal using the common telephone number to identify the mobile terminal;

causing a request to accept a call to be sent to the mobile terminal using the second telephone number via the second telephone network;

causing a connection to be made between the agent computer and the mobile terminal; and if the third party terminal accepts the request, causing a connection to be made between the agent computer and the third party terminal.

9. The telephone switching method of claim 8, wherein the first and second telephone numbers are a PSTN telephone number and an IP telephone number, respectively.

10. The telephone switching method of claim 8, wherein the agent computer periodically receives new information identifying the telephone network to which the mobile terminal is connected while the mobile terminal is switched on and connected to one of the first or second telephone networks and, in response to the receipt of the new information, the agent computer updates the memory to reflect which of the first and second telephone networks the mobile terminal is presently connected to.

11. The telephone switching method of claim 8, wherein the agent computer sets up the two connections via a SIP server.

12. The telephone switching method of claim 11, wherein the agent computer sends a request to the SIP server to establish the connection between the agent computer and the mobile terminal, and the SIP server responds to that request by sending the request to accept the call sent to the mobile terminal using the second telephone number.

13. The telephone switching method of claim 8, wherein the agent computer, upon receiving a call request from a fourth party identifying the third telephone number as the called number:

determines which telephone network the mobile terminal is presently connected to as a function of the information stored in the memory; and sends a connection request to the mobile terminal using the telephone number corresponding to the telephone network to which the mobile terminal is presently connected as indicated by the information stored in the memory.

* * * * *